US010750353B2

(12) United States Patent
Erginler et al.

(10) Patent No.: US 10,750,353 B2
(45) Date of Patent: *Aug. 18, 2020

(54) CONNECTIVITY SYSTEM FOR ESTABLISHING DATA ACCESS IN A FOREIGN MOBILE NETWORK

(71) Applicant: Trawell Data Services Inc., Syosset, NY (US)

(72) Inventors: Ali Emre Erginler, New York City, NY (US); Bulent Hakan Dulge, New York City, NY (US); Dilek Cilingir, New York City, NY (US); Hudai Sami Asmaz, Seattle, WA (US); Adnan Ekici, Seattle, WA (US); Yusuf Balci, Istanbul (TR)

(73) Assignee: Trawell Data Services Inc., Syosset, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,447

(22) Filed: May 23, 2019

(65) Prior Publication Data
US 2019/0342747 A1    Nov. 7, 2019

Related U.S. Application Data

(63) Continuation of application No. 15/728,284, filed on Oct. 19, 2017, now Pat. No. 10,306,462, which is a
(Continued)

(51) Int. Cl.
*H04W 8/18*    (2009.01)
*H04W 8/06*    (2009.01)
(Continued)

(52) U.S. Cl.
CPC ........... *H04W 8/183* (2013.01); *H04M 15/80* (2013.01); *H04M 15/835* (2013.01);
(Continued)

(58) Field of Classification Search
CPC ....... H04W 8/183; H04W 8/06; H04W 48/18; H04W 48/00; H04W 4/12; H04W 60/00;
(Continued)

(56) References Cited

U.S. PATENT DOCUMENTS 9,220,025 B2    12/2015    Poon et al.
10,382,943 B2 *    8/2019    Wang .................. H04W 8/02
(Continued)

OTHER PUBLICATIONS

PCT International Search Report and Written Opinion of International Searching Authority in corresponding International Application No. PCT/US2017/031111 issued by the Korean Intellectual Property Office, dated Aug. 31, 2017.
PCT International Preliminary Report on Patentability of International Preliminary Examination Authority in corresponding International Application No. PCT/US2017/031111 issued by the Korean Intellectual Property Office, dated Nov. 6, 2018.
(Continued)

*Primary Examiner* — Marcus Hammonds
(74) *Attorney, Agent, or Firm* — Baker & MacKenzie LLP

(57) ABSTRACT

This disclosure is directed to establishing data access for a mobile device in a foreign mobile network. An exemplary method comprises executing a first attach operation (e.g., an IMSI attach operation) for a mobile device, the first attach operation resulting in a successful first attachment for the mobile device; determining, for a particular period, non-execution of a second attach operation (e.g., a GPRS operation) for a second attachment for the mobile device; classifying, based on the successful first attachment and the non-execution of the second attach operation for the particular period, the mobile device as a silent roamer; and determining whether the mobile device is associated with a data package for establishing a first quota of data access.

20 Claims, 17 Drawing Sheets

Related U.S. Application Data continuation of application No. PCT/US2017/031111, filed on May 4, 2017.

(60) Provisional application No. 62/331,953, filed on May 4, 2016.

(51) Int. Cl.
  *H04W 4/12* (2009.01)
  *H04W 48/00* (2009.01)
  *H04W 60/00* (2009.01)
  *H04W 48/18* (2009.01)
  *H04M 15/00* (2006.01)
  *H04W 8/20* (2009.01)

(52) U.S. Cl.
  CPC ............ *H04M 15/85* (2013.01); *H04W 4/12* (2013.01); *H04W 8/06* (2013.01); *H04W 48/00* (2013.01); *H04W 48/18* (2013.01); *H04W 60/00* (2013.01); *H04W 8/20* (2013.01)

(58) Field of Classification Search
  CPC ..... H04W 8/20; H04M 15/85; H04M 15/835; H04M 15/80
  See application file for complete search history.

(56) References Cited

U.S. PATENT DOCUMENTS

| | | | |
|---|---|---|---|
| 2010/0054222 A1* | 3/2010 | Rune | H04L 29/12066 370/338 |
| 2010/0150057 A1* | 6/2010 | Miklos | H04W 8/082 370/328 |
| 2011/0026463 A1 | 2/2011 | Lair | |
| 2011/0130118 A1 | 6/2011 | Fan | |
| 2012/0046058 A1* | 2/2012 | Vesterinen | H04W 8/082 455/509 |
| 2015/0071086 A1 | 3/2015 | Collins et al. | |
| 2015/0078167 A1 | 3/2015 | Papa et al. | |
| 2015/0244537 A1* | 8/2015 | Paquette | H04W 4/24 370/259 |
| 2016/0029199 A1 | 1/2016 | Shi | |
| 2016/0088461 A1* | 3/2016 | Jiang | H04M 7/1285 455/432.1 |

OTHER PUBLICATIONS

Watts, Kevin, "Customer Engagement Score Is One Metric That Really Matters," Syniverse Blog, pp. 1-6. [Online] Retrieved from Internet, Sep. 25, 2017. synergy.syniverse.com/2014/08/customer-engagement-score-one-metric-really-matters/. Published Aug. 26, 2014.

\* cited by examiner

CONNECTIVITY SYSTEM FOR ESTABLISHING DATA ACCESS IN A FOREIGN MOBILE NETWORK

CROSS REFERENCE TO RELATED APPLICATIONS

This application is a continuation of and claims priority to U.S. patent application Ser. No. 15/728,284 filed Oct. 9, 2017, which is a continuation of and claims priority to International Application No. PCT/US2017/031111 filed on May 4, 2017, which claims benefit of and priority to U.S. Provisional Patent Application No. 62/331,953 filed on May 4, 2016, the contents of all of which are hereby incorporated by reference in their entirety.

TECHNICAL FIELD

This disclosure is directed to mobile networks.

BACKGROUND

When a mobile device user lands in a foreign country and attempts to access data on the mobile device, the foreign mobile network makes a connection to the home network of the mobile device to perform various data access-related operations such as DNS operations. This happens for each attempt to access data on the mobile device. Therefore fore each attempt to access data on the mobile device, signals may be transmitted from the foreign mobile network on satellites, fiber optic cables, and/or underwater cables. Energy resources are used for establishing these complex international connections and transmitting signals on these complex international connections. The present invention enables conservation of these precious energy resources by eliminating these needless signals that are transmitted from the foreign mobile network to the home mobile network for each attempt to access data on the mobile device. The present invention conserves energy resources by providing data access to a mobile device user in a foreign country by facilitating easy access to the foreign mobile network without involving any signaling to the home mobile network.

BRIEF SUMMARY

In some embodiments, a method for is provided for establishing data access for a mobile device in a foreign mobile network. The method comprises: executing a first attach operation for a mobile device, the first attach operation resulting in a successful first attachment for the mobile device; determining, for a particular period, non-execution of a second attach operation associated with a second attachment for the mobile device; classifying, based on the successful first attachment and the non-execution of the second attach operation for the particular period, the mobile device as a silent roamer; and determining whether the mobile device is associated with a data package for establishing a first quota of data access.

In some embodiments, the method further comprises in response to determining the mobile device is not associated with a data package, activating a second quota of data access for the mobile device, the second quota of data access used for establishing the data package for the mobile device, the second quota of data access being less than the first quota of data access.

In some embodiments, the method further comprises transmitting a message to the mobile device regarding an option of establishing a data package for the mobile device.

In some embodiments, the second quota of data access is activated based on transmitting a message to the mobile device regarding an option of establishing the data package for the mobile device; and receiving a positive response to the message.

In some embodiments, the message comprises a text or multimedia message.

In some embodiments, the method further comprises determining the mobile device is associated with the data package; determining the first quota of data access is less than a threshold quota level; transmitting a message to the mobile device regarding an option of replenishing the first quota of data access; receiving a positive response to the message; and replenishing, based on the positive response, the first quota of data access.

In some embodiments, the mobile device comprises a Subscriber Identity Module (SIM) card associated with a home mobile network of the mobile device, wherein the SIM card is compatible with the home mobile network (i.e., enables access or provides credentials to enable access to the home mobile network), and wherein the SIM card is compatible with the foreign mobile network for registering the mobile device with the foreign mobile network and using resources from the foreign mobile network. In some embodiments, the mobile device obtains a roaming number (e.g., a phone number) that is assigned to the mobile device by the foreign mobile network.

In some embodiments, the mobile device comprises an APN (access point name) setting associated with a home mobile network of the mobile device.

In some embodiments, the first attach operation comprises an international mobile subscriber identity (IMSI) attach operation.

In some embodiments, the second attach operation comprises a general packet radio system (GPRS) attach operation.

In some embodiments, the first attach operation is executed before, after, or substantially simultaneously with the second attach operation.

In some embodiments, the method further comprises establishing the data package for the mobile device, wherein establishing the data package for the mobile device comprises downloading an application or accessing a website using the second quota of data access.

In some embodiments, the mobile device accesses the Internet using the data package and via a connectivity system.

In some embodiments, the mobile device accesses the Internet without connecting to a home mobile network of the mobile device, and without changing an APN setting on the mobile device.

In some embodiments, the connectivity system is located between a serving general packet radio system support node (SGSN) or visited serving gateway (SGW) of the foreign mobile network and a gateway general packet radio system support node (GGSN) or visited packet gateway (PGW) of the foreign mobile network.

In some embodiments, the connectivity system: receives data traffic from a visited serving general packet radio system support node (SGSN) or visited serving gateway (SGW), wherein the visited SGSN or visited SGW receives the data traffic from the mobile device; determines whether the data traffic comprises local breakout (LBO) traffic or non-LBO traffic; and in response to determining the data traffic comprises LBO traffic, transmits the LBO traffic to the visited gateway general packet radio system support node (GGSN) or visited packet gateway (PGW).

In some embodiments, a network address lookup (e.g., an Internet Protocol (IP) address lookup at a DNS server) for a foreign access point name (APN) associated with the mobile device results in a network address of the connectivity system. In some embodiments, a DNS lookup (i.e., a lookup operation executed at a DNS server) for the APN associated with the mobile device results in an IP address. Normally, this IP address belongs to the home GGSN or home PGW associated with the mobile device. However, according to the system described herein, the DNS lookup operation results in an IP address for the connectivity system.

In some embodiments, a connectivity system is provided for directing data traffic in a foreign mobile network. The connectivity performs receiving data traffic from a visited serving general packet radio system support node (SGSN) or visited serving gateway (SGW) associated with the foreign mobile network, wherein the visited SGSN or visited SGW receives the data traffic from a foreign APN associated with a mobile device, wherein a network address lookup for the foreign APN results in a network address of the connectivity system; determining whether the data traffic comprises local breakout (LBO) traffic or non-LBO traffic; and in response to determining the data traffic comprises LBO traffic, transmitting the LBO traffic to the visited gateway general packet radio system support node (GGSN) or visited packet gateway (PGW) associated with the foreign mobile network.

In some embodiments, the LBO traffic is associated with a subscription to the connectivity system, wherein the subscription comprises a first quota of data access.

In some embodiments, the first quota of data access is offered to the mobile device based on: executing a first attach operation for a mobile device, the first attach operation resulting in a successful first attachment for the mobile device; determining, for a particular period, non-execution of a second attach operation associated with a second attachment for the mobile device; and classifying, based on the successful first attachment and the non-execution of the second attach operation for the particular period, the mobile device as a silent roamer.

In some embodiments, the connectivity system is further for in response to determining the data traffic comprises non-LBO traffic, transmitting the LBO traffic to the visited GGSN or visited PGW associated with the foreign mobile network.

In some embodiments, domestic data traffic associated with a domestic APN is transmitted directly from the visited SGSN or the visited SGW to the visited GGSN or the visited PGW, and is not transmitted via the connectivity system.

In some embodiments, domestic data traffic is received from the mobile device.

In some embodiments, a method is provided for establishing data access for a mobile device in a foreign mobile network, the method comprising: executing, using one or more computing device processors, a first attach operation for a mobile device, the first attach operation resulting in a successful first attachment for the mobile device, the first attach operation comprising a voice attach operation; determining, using the one or more computing device processors, for a particular period, successful or unsuccessful of a second attach operation associated with a second attachment for the mobile device, the second attach operation comprising a data attach operation; determining, using the one or more computing device processors, whether the mobile device is associated with a data package for establishing a first quota of data access; and classifying, using the one or more computing device processors, the mobile device based on determining successful or unsuccessful execution of the second attach operation associated with the second attachment for the mobile device, and based on determining whether the mobile device is associated with the data package for establishing the first quota of data access.

In some embodiments, the method further comprises determining whether the mobile device previously refused to be associated with a data package for establishing a first quota of data access.

In some embodiments, the method further comprises determining whether the mobile device previously did not respond to, within a response period, a prompted association with the first quota of data access.

In some embodiments, the mobile device is classified as an active mobile device in response to determining the second attachment for the mobile device and determining the mobile device is associated with the data package.

In some embodiments, the mobile device performs one or more data operations using the data package.

In some embodiments, the one or more data operations comprise an Internet operation, an email operation, a mobile application operation, a social network operation, or a messaging operation.

In some embodiments, the data package is associated with a data usage amount or a remaining data amount.

In some embodiments, the method further comprises transmitting a message to the mobile device when the data usage amount exceeds a threshold level or the remaining data amount falls below a second threshold level.

In some embodiments, the data package is associated with a data usage period.

In some embodiments, the method further comprises receiving, from the mobile device, an instruction to renew the data package.

In some embodiments, the connectivity system is installed in the foreign mobile network and functions as proxy through which data access is provided to the mobile device.

In some embodiments, the mobile device is located in a foreign country different from a home country of the mobile device.

In some embodiments, the mobile device is located in a foreign mobile network different from a home mobile network of the mobile device.

In some embodiments, the mobile device is located outside the mobile device's home network.

In some embodiments, the foreign mobile network is associated with a foreign country different from the mobile device's home country.

In some embodiments, the mobile device is classified as a silent roaming mobile device in response to determining the second attachment for the mobile device is unsuccessful and determining the mobile device is not associated with the data package.

In some embodiments, the method further comprises transmitting a message to the mobile device, the message prompting the mobile device to initialize association of a data package with the mobile device.

In some embodiments, the method further comprises associating a second data package with the mobile device, the second data package being associated with at least one of a data amount or a data period.

In some embodiments, the mobile device uses the second package to initiate association of the data package with the mobile device.

In some embodiments, the association of the data package with the mobile device is initialized on a mobile application associated with the connectivity system.

In some embodiments, the association of the data package with the mobile device is initialized on a webpage associated with the connectivity system.

In some embodiments, the method further comprises in response to determining the mobile device does not complete association of the data package with the mobile device, dissociating the second data package from the mobile device.

In some embodiments, the method further comprises determining whether execution of the second attachment is successful during a second particular period, the second particular period following associating a second data package with the mobile device, the second data package being associated with at least one of a data amount or a data period, the data amount or the data period being less than a second data amount or a second data period associated with the data package, respectively.

In some embodiments, the method further comprises in response to determining execution of the second attachment is not successful during the second particular period, dissociating the second data package from the mobile device.

In some embodiments, the method further comprises transmitting a message to the mobile device informing the mobile device that the mobile device is not using the connectivity system's proxy service for accessing data on the foreign mobile network.

In some embodiments, the method further comprises transmitting a message to the mobile device in response to determining unsuccessful execution of the second attachment for the mobile device and determining the mobile device is associated with the data package, the message informing a user of the mobile device to activate a data function of the mobile device.

In some embodiments, the method further comprises determining exhaustion of the data package, wherein exhaustion of the data package comprises determining a consumption of the data package is equal to or greater than a threshold consumption level, or a remaining data level of the data package is less than a threshold remaining data level; or determining a usage period of the data package is equal to or greater than a threshold usage level, or a remaining usage level of the data package is equal to or greater than a threshold remaining usage level.

In some embodiments, the method further comprises determining whether the mobile device is pre-associated with one or more other data packages, the one or more other data packages being inactive or not currently in use by the mobile device.

In some embodiments, the method further comprises determining whether the second attachment of the mobile device is unsuccessful or the mobile device is not located in or connected to the foreign mobile network; or determining whether the second attachment of the mobile device is successful, and at least one of the mobile device is establishing data access using a different data package other than the data package, and the mobile device is located in or connected to the foreign mobile network.

In some embodiments, the method further comprises in response to: determining the mobile device is pre-associated with one or more other data packages; and determining the exhaustion of the data package occurs while: determining the second attachment of the mobile device is unsuccessful or the mobile device is not located in or connected to the foreign mobile network; or determining the second attachment of the mobile device is successful, and at least one of the mobile device is establishing data access using a different data package other than the data package, and the mobile device is located in or connected to the foreign mobile network, not activating the one or more other data packages for the mobile device.

In some embodiments, the method further comprises in response to: determining the mobile device is pre-associated with one or more other data packages; determining the mobile device is currently using the data package to establish data access for the mobile device; and determining the second attachment of the mobile device is successful and the mobile device is located in or connected to the foreign mobile network, activating the one or more other data packages for the mobile device.

In some embodiments, the method further comprises in response to determining the mobile device is not pre-associated with one or more other data packages, sending a message to the mobile device.

In some embodiments, the method further comprises deactivating, for the mobile device, the connectivity system's proxy service for providing data access to the mobile device.

In some embodiments, the method further comprises receiving, from the mobile device, an instruction to deactivate proxy service provided by the connectivity system for the mobile device, the proxy service enabling the mobile device to access data on the mobile device via the connectivity system.

In some embodiments, the method further comprises receiving, from a second foreign mobile network, notification that the mobile device has connected to the second foreign mobile network.

In some embodiments, the connectivity system's proxy service for providing data access to the mobile device is deactivated for the mobile device.

In some embodiments, the method further comprises transmitting a message to the mobile device, the message prompting the mobile device to re-establish connection with the foreign mobile network for activating, for the mobile device, the connectivity system's proxy service for providing data access to the mobile device.

In some embodiments, the foreign mobile network comprises at least one of a 2G, 3G, 4G, or 5G network.

In some embodiments, the foreign mobile network comprises a Long Term Evolution (LTE) network.

In some embodiments, the method further comprises upon detecting the mobile device, determining, based on signaling information received from the mobile device, a language associated with the mobile device's home network.

In some embodiments, the method further comprises transmitting a message to the mobile device, the message providing information associated with the connectivity system's proxy service, the message in the language associated with the mobile device's home network.

In some embodiments, the method further comprises transmitting a message to the mobile device, the message in the language associated with the mobile device's home network, and the message providing a user with response options for changing a language of future messages to a different language, the future messages providing information associated with the connectivity system's proxy service.

In some embodiments, the method further comprises receiving data traffic from a visited serving general packet radio system support node (SGSN) or a visited serving gateway (SGW) associated with the foreign mobile network, wherein the visited SGSN or SGW receives the data traffic from a foreign access point name (APN) associated with a mobile device, wherein a network address lookup for the foreign APN results in a network address of the connectivity system; determining whether the data traffic comprises local breakout (LBO) traffic or non-LBO traffic; and in response to determining the data traffic comprises LBO traffic, transmitting the LBO traffic to a visited gateway general packet radio system support node (GGSN) or visited packet gateway (PGW) associated with the foreign mobile network. Any reference to SGSN or GGSN in this disclosure may refer to SGW or PGW, respectively, in a different type of network.

In some embodiments, the LBO traffic is associated with a subscription to the connectivity system, wherein the subscription comprises a first quota of data access.

In some embodiments, the first quota of data access is offered to the mobile device based on: executing a first attach operation for the mobile device, the first attach operation resulting in a successful first attachment for the mobile device; determining, for a particular period, non-execution of a second attach operation associated with a second attachment for the mobile device; and classifying, based on the successful first attachment and the non-execution of the second attach operation for the particular period, the mobile device as a silent roamer.

In some embodiments, the connectivity system is further for in response to determining the data traffic comprises non-LBO traffic, transmitting the LBO traffic to the visited GGSN or PGW associated with the foreign mobile network.

In some embodiments, domestic data traffic associated with a domestic APN is transmitted directly from the visited SGSN or SGW to the visited GGSN or PGW, and is not transmitted via the connectivity system.

In some embodiments, domestic data traffic is received from the mobile device.

In some embodiments, a system is provided for establishing data access for a mobile device in a foreign mobile network, the system configured for: executing a first attach operation for a mobile device, the first attach operation resulting in a successful first attachment for the mobile device, the first attach operation comprising a voice attach operation; determining, for a particular period, successful or unsuccessful of a second attach operation associated with a second attachment for the mobile device, the second attach operation comprising a data attach operation; determining whether the mobile device is associated with a data package for establishing a first quota of data access; and classifying the mobile device based on determining successful or unsuccessful execution of the second attach operation associated with the second attachment for the mobile device, and based on determining whether the mobile device is associated with the data package for establishing the first quota of data access.

In some embodiments, a non-transitory computer-readable medium is provided for establishing data access for a mobile device in a foreign mobile network, the non-transitory computer-readable medium comprising code configured for: executing a first attach operation for a mobile device, the first attach operation resulting in a successful first attachment for the mobile device, the first attach operation comprising a voice attach operation; determining, for a particular period, successful or unsuccessful of a second attach operation associated with a second attachment for the mobile device, the second attach operation comprising a data attach operation; determining whether the mobile device is associated with a data package for establishing a first quota of data access; and classifying the mobile device based on determining successful or unsuccessful execution of the second attach operation associated with the second attachment for the mobile device, and based on determining whether the mobile device is associated with the data package for establishing the first quota of data access.

Figure 1:
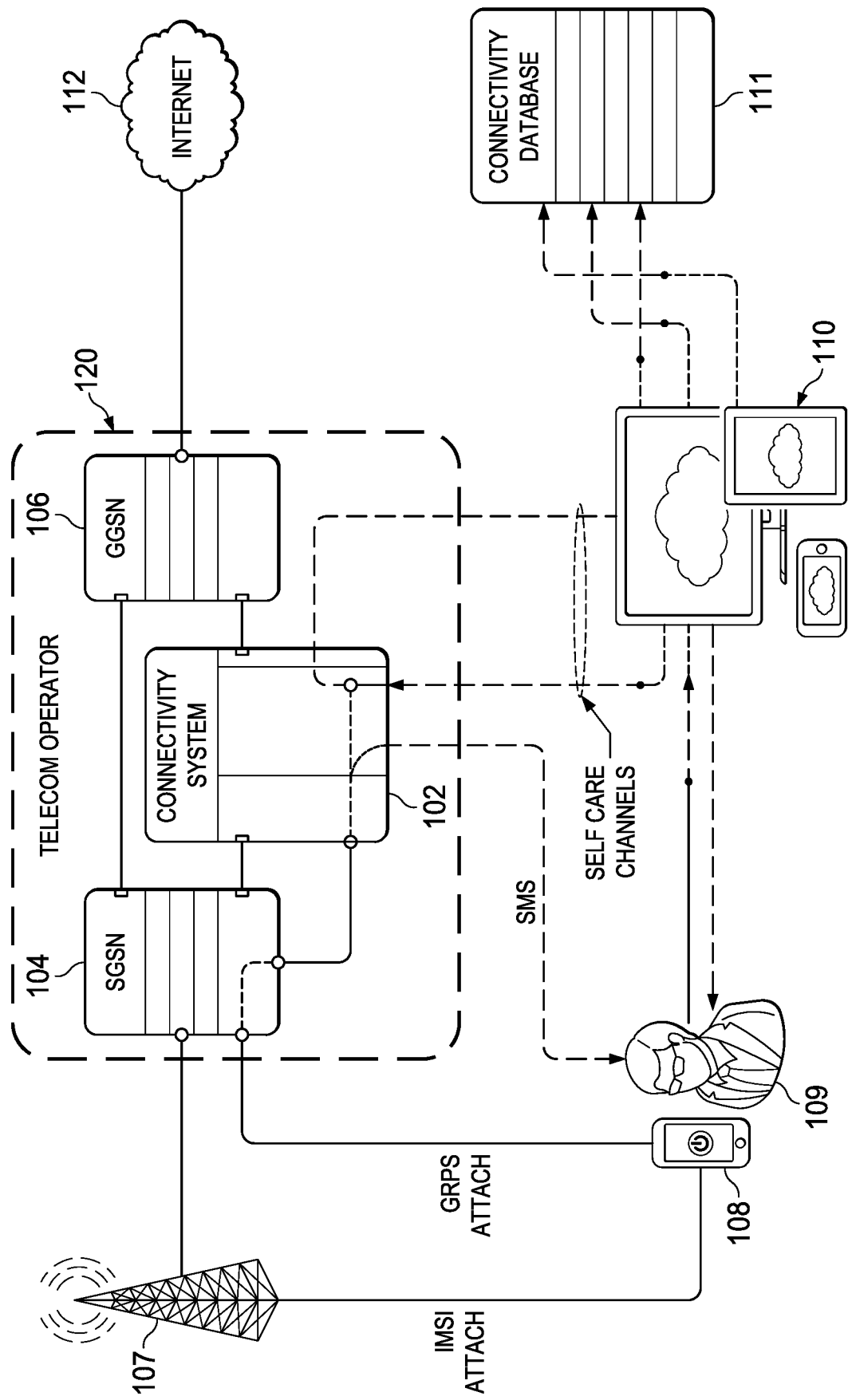
FIG. 1 is a diagram of a communication network, in accordance with some embodiments of the invention.

All of these drawings are illustrations of certain embodiments. The scope of the claims is not limited to the specific embodiments illustrated in the drawings and described herein.

DETAILED DESCRIPTION OF THE EMBODIMENTS

The following is a glossary of terms associated with mobile networks and the technology described in this disclosure. Note that some terms may not be used in this disclosure.

3G: GPRS/UMTS mobile telephony systems as standardized by the 3GPP
3GPP: 3rd Generation Partnership Project (www.3gpp.org)
AF: Application Function
API: Application Programming Interface
APN: Access Point Name
ARP: Alternative Roaming Provider
BBERF: Bearer Binding & Event Reporting Function
CDMA: Code Division Multiple Access
CDR: Call Detail Record
DB: Database
DNS: Domain Name System
EU: European Union
FTP: File Transfer Protocol
FUP: Fair Usage Policy
GGSN: Gateway GPRS Support Node
GPRS: General Packet Radio System
GTP: GPRS Tunneling Protocol
HLR: Home Location Register
HSS: Home Subscriber Server
HTTP: Hypertext Transfer Protocol
IETF: Internet Engineering Task Force (www.ietf.org)
IMS: IP Multimedia Subsystem IMSI: International Mobile Subscriber Identity
IP: Internet Protocol
LBO: Local Breakout
LDAP: Lightweight Directory Access Protocol
LTE: Long Term Evolution
MAP: Mobile Application Part
MDN: Mobile Directory Number
MME: Mobility Management Entity
MMS: Multimedia Messaging Service
MRS: Monitoring & Reporting System
MSC: Mobile Switching Center
MSISDN: Mobile Station ISDN Number
NEBS: Network Equipment Building System NMS: Network Management System
OCS: Online Charging System
OFCS: Offline Charging System
O&M: Operation and Maintenance
OSS: Operations Support System
PGW: Packet Gateway
P2P: Peer To Peer (file-sharing applications)
PCC: Policy & Charging Control
PCEF: Policy & Charging Enforcement Function
PCRF: Policy & Charging Rule Function
PLMN: Public Land Mobile Network
PMI: Platform Management Interface
QoS: Quality of Service
SFTP: Secure File Transfer Protocol
SGSN: Serving GPRS Support Node
SGW: Serving Gateway
SIM: Subscriber Identity Module
SMPP: Short Message Peer to Peer protocol
SMS: Short Message Service
SMSC: Short Message Service Center
SNMP: Simple Network Management Protocol
SOAP: Simple Object Access Protocol
SPR: Subscriber Profile Repository
SS7: Signaling System No 7
STP: Signal Transfer Point
USSD: Unstructured Supplementary Services Data
VMS: Voucher Management System
VoLTE: Voice over Long-term Evolution
VLR: Visitor Location Register
XML: Extensible Markup Language The present invention comprises a LBO connectivity system that enables a foreign mobile network or an operator of the foreign mobile network to provide data access to a newly detected mobile device without using the home network of the newly detected mobile device. The connectivity system disclosed herein differs from other systems by providing a detection process for a "silent roaming" mobile device (or silent roamer). If a voice connection is established between the foreign mobile network and the mobile device, but no data connection is established between the foreign mobile network and the mobile device, within a predetermined period, the connectivity system classifies the mobile device as a silent roamer. Additionally, the connectivity system disclosed herein differs from other systems by being located in between the SGSN and GGSN of the foreign mobile network. This means that the mobile device does not need to change the mobile device's APN setting in order to establish data access using the foreign mobile network. Additionally, the connectivity system enables the mobile device to access data without changing the mobile device's SIM card and without the need to find a non-mobile network data bearer such as a Wi-Fi connection. The present invention is can be used with any mobile network protocol such as 3G, 4G, LTE, UMTS, etc. As used herein, a mobile network may also be referred to as a cellular network.

As further explained herein, upon being classified as a silent roamer, the connectivity system assigns a limited amount of data to the mobile device in order for the mobile device to purchase a data package offered by the operator of the foreign mobile network. As used herein, the terms "purchase" and "establish" may be used interchangeably. In some embodiments, as the mobile device uses up a certain amount of data associated with the data package and/or uses a certain amount of time associated with the data package, a renewal message (e.g., an SMS) may be transmitted (e.g., by the connectivity system) to the mobile device. The user of the mobile device may renew the data package by transmitting a response message (e.g., an SMS) to the sender of the message.

In some embodiments, the connectivity system is integrated into an operator network (e.g., a GSM operator network). The connectivity system may comprise first probing infrastructure hardware and/or software which identifies the IMSI attach procedure established in the foreign mobile network. The connectivity system also comprise second probing infrastructure hardware and/or software which detects the network signaling associated with mobile devices in the foreign mobile network and detects that the mobile device has not established a data session (e.g., a GPRS session) within a certain period of time. The connectivity system sends a message to the mobile device prompting the mobile device to establish a subscription account for the mobile device. If a subscription account is established, the connectivity system acts as a data access proxy for the mobile device that enables the mobile device to access data using the foreign mobile network without needing to install a new SIM card associated with the foreign mobile network.

In some embodiments, a mobile device described herein may be a mobile computing device, a mobile phone, laptop, tablet, watch, e-reader, headgear, eyewear, etc. The mobile device may have voice and data capabilities. In some embodiments, the term "data" may refer to "signal" or "information." In some embodiments, the terms "signal," "data," and "information" may be used interchangeably. Any reference to data may also include references to the contents of the data. Any signals described herein may be electronic or electromagnetic signals. Additionally, any signals described herein may be either be transitory or non-transitory signals. Additionally, any signals described herein may be analog signals, digital signals, and/or mixed analog and digital signals. The terms "system," "apparatus," "server," "box," "agent," "device," "unit," "sub-unit," "element," "application," "infrastructure," etc., may be used interchangeably in some embodiments. In some embodiments, a method is provided for performing the various steps performed by any system described herein. In some embodiments, a non-transitory computer-readable medium comprising code is provided for causing a system to perform the various methods described herein. In some embodiments, a system may comprise a housing that includes various units, such as those illustrated in FIG. 3. In some embodiments, a chipset may be disposed in the housing and may be interfaced with a processor. The chipset may have hardware (e.g., electronic components in an electronic circuit) for supporting various connections within the system, or any other connection from the system to external systems. A connectivity system as described herein may also be referred to as a connectivity box.

FIG. 1 is a diagram of a communication network (e.g., a mobile communication network), in accordance with some embodiments of the invention. FIG. 1 includes a telecom operator 120 that comprises a SGSN 104, a connectivity system 102, and a GGSN 106. Also presented are a base station 107 and the Internet 112. The Internet may represent any network such as a LAN, WAN, the Internet, etc. Also presented are a mobile device 108, a user 109 of the mobile device, self care channels 110 for the connectivity system, and a connectivity database 111. FIG. 1 presents exemplary connections between the various systems, devices, and/or entities described herein. This disclosure is not limited to the exemplary connections presented herein, and connections may exist between some systems, devices, and/or entities even though they are not displayed as being connected in FIG. 1. Additionally, some connections presented in FIG. 1 may be optional.

The connectivity system identifies silent roaming mobile devices (silent roamers) that disable data roaming functionality, and enables these silent roamers to obtain data access. In some embodiments, the mobile device in FIG. 1 is a silent roaming mobile device. The connectivity system identifies silent roamers by probing network attachment related (IMSI attachment and DATA/GPRS/LTE attachment) signaling in the network between a visited PLMN (VPLMN) and a home PLMN (HPLMN) for the roamer, where for silent roamers, IMSI attachment is replied as authorized by HPLMN to VPLMN, but there exists no DATA/GPRS/LTE attachment reply or authorization from HPLMN to VPLMN due to the data roaming functionality being disabled on the mobile device.

The connectivity system transmits a notification to a silent roamer about a data access service after setting a temporary subscription for the silent roamer. The temporary subscription may be associated with a limited amount of data (e.g., 50 MB). The notification to the silent roamer may be via a message such as an SMS, an MMS, or a USSD. In alternative embodiments, the silent roamer may be notified by any type of message transmitted via a mobile network. In still alternative embodiments, the silent roamer may be notified via a voice call or a voicemail transmitted via a mobile network. In still alternative embodiments, the silent roamer may learn about the data service via other any other means that do not include transmitting a message to the silent roamer. In some embodiments, the term "roaming" may refer to the ability of a mobile device user to send and receive data (e.g., using the Internet) when traveling outside the geographical coverage area of the mobile device's home network (i.e., when traveling to a geographical coverage area of a foreign mobile network).

In some embodiments, the connectivity system acts as a proxy between VPLMN SGSN (visited SGSN) and VGGSN (visited GGSN). This proxy capability allows the connectivity system to map a foreign silent roamer APN to a uniform APN accepted by the visited GGSN. Mapping the foreign silent roamer APN to a uniform APN allows accumulation or control of data sessions conducted on the foreign silent roamer. Controlling the data session allows redirecting web pages accessed during the temporary subscription to a particular webpage (e.g., a webpage associated with the connectivity system). Controlling the data session also means that no webpages other than the particular webpage may be accessed on the foreign silent roamer. As used herein, a web page may refer to a web site, a web application, etc. Redirecting the data session to particular webpage may allow a user of the silent roamer to obtain data access by establishing a subscription for a data access service. The silent roamer may choose a subscription from one or more presented subscriptions, wherein each subscription may be associated with a particular data access quota, a particular data access period, a particular data access area, and/or a particular data access price.

If a data package is established by the silent roamer, a certain quota may be established for the silent roamer for a particular location (e.g., an airport, a grocery store, etc.) and particular operator mobile network associated with the particular location. In some embodiments, the silent roamer accesses data over a data path controlled by the connectivity system on the visited PLMN. The connectivity system controls data traffic as a proxy between SGSN and GGSN of the visited PLMN. In some embodiments, the connectivity system transmits a message to the silent roamer when the silent roamer uses up a certain percentage (e.g., 75%) of the quota associated with the silent roamer's subscription. Upon consuming the quota, the connectivity system resets the subscription for the silent roamer such that the display (e.g., the displayed webpage) on the silent roamer is redirected to the subscription webpage.

In some embodiments, the self-care channels may be computing devices that are used for performing operations associated with the connectivity system. The connectivity database may store any data that is accessed by the connectivity system (e.g., subscriber data, data package usage, remaining data package quota, etc.). In some embodiments, the self-care channels and/or the connectivity database may be integrated into the connectivity system. Any connections presented in FIG. 1 or any other figure may be wired or wireless connections.

Figure 2:
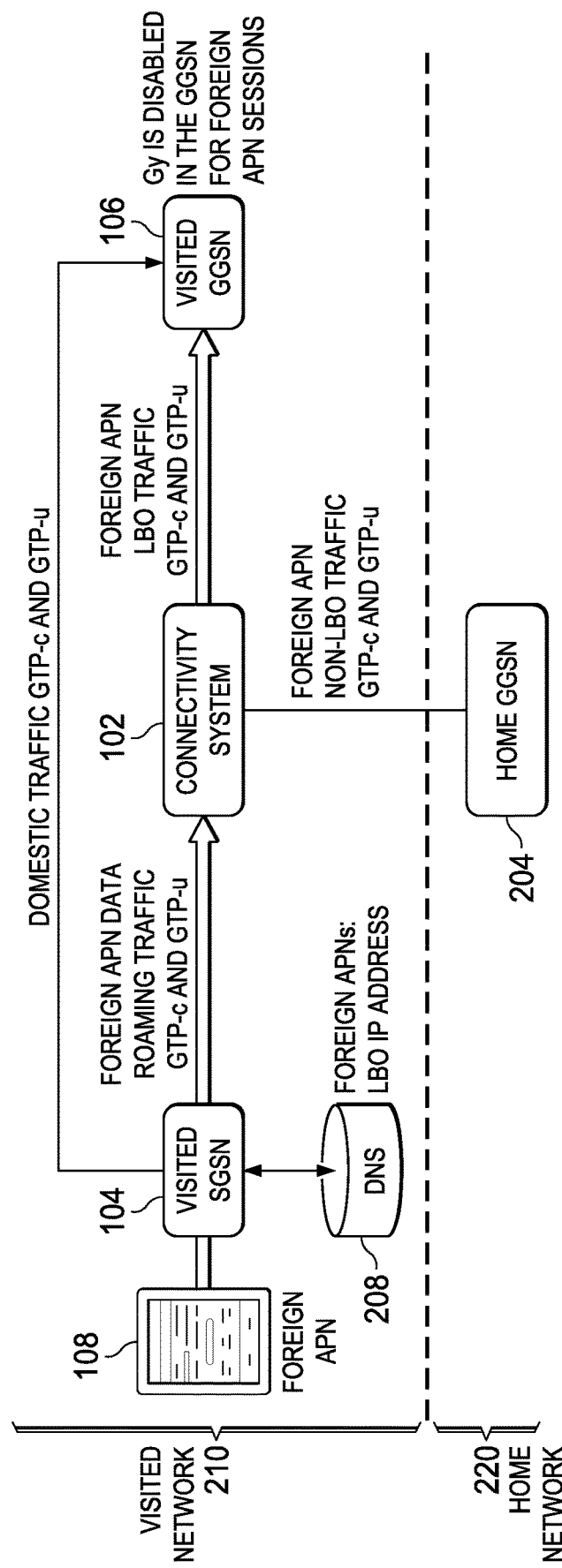
FIG. 2 is a diagram of a data traffic flow using a connectivity system, in accordance with some embodiments of the invention.

FIG. 2 illustrates a data traffic flow using a connectivity system. FIG. 2 presents a visited network 210 (e.g., in relation to the mobile device 108) and a home network 220 (e.g., in relation to the mobile device 108) comprising a home GGSN 204. FIG. 2 also presents a foreign APN which is associated with or refers to the mobile device 108. The foreign APN transmits data roaming traffic (or data packets) to the visited SGSN 104. The visited SGSN accesses a DNS server 218 to determine whether the IP address associated with the received data roaming traffic is an LBO IP address. The DNS server may determine whether an IP address is a domestic IP address or an LBO IP address. In some embodiments, the DNS server may comprise a database of domestic IP addresses and/or LBO IP addresses. In some embodiments, the DNS server may be integrated into the operator SGSN. In some embodiments, any functions described as being performed by the DNS server may be performed wholly by the visited SGSN or by a combination of the DNS server and the visited SGSN.

If the DNS server determines that the IP address associated with the data roaming traffic (or a transmitter of the data roaming traffic) is a LBO IP address, data roaming traffic passes from the visited SGSN to the visited GGSN via the connectivity system. The home network is not involved in this data traffic path, i.e., the home GGSN has been replaced in a traditional data traffic path by the visited GGSN. For this data traffic path, both the GTP control signals (GTP-C) and the GTP data signals (GTP-U) pass through the connectivity system, which directs the GTP stream (GTP-C and GTP-U) to the visited GGSN, thus eliminating the need for home network involvement. The online charging interface (i.e., the Gy) is disabled in the visited GGSN for foreign APN data sessions.

The DNS server (in coordination with the visited SGSN) routes the foreign APN data roaming traffic to the connectivity system by resolving the foreign APN's IP address (e.g., the mobile device IP address and/or mobile device APN IP address) to the connectivity system's IP address.

Upon the data roaming traffic reaching the connectivity system, the connectivity system determines whether an active subscription exists with the connectivity system. The active subscription may be associated with the mobile device or a particular IP address associated with the mobile device. If an active subscription is found, the data roaming traffic is LBO traffic and is transmitted to the visited GGSN. If an active subscription is not found, the data roaming traffic is non-LBO traffic, and is transmitted to the home GGSN. If an active subscription to the connectivity system is not found, data access via the visited GGSN is not provided to the silent roamers.

The GTP interface in FIG. 2 may comprise at least one of the GTP-U interface and the GTP-C interface. The GTP-U interface is the interface between SGSN and GGSN that comprises the data stream of a data session. The GTP-C interface is the interface between SGSN and GGSN that comprises the data session control signaling. When the silent roaming mobile device has an active subscription with the connectivity system, the GTP interface is between the visited SGSN and the visited GGSN. In the case where the roamer has no active connectivity system subscription, the visited SGSN will communicate over the GTP interface to the home GGSN, and not to the visited SGSN.

Domestic traffic (e.g., associated with a domestic APN of the same mobile device 108 or a different mobile device) is unaffected by the connectivity system, and does not pass through the connectivity system. Therefore, if the DNS server (e.g., in coordination with the visited GGSN) determines that the IP address associated with the data roaming traffic (or a transmitter of the data roaming traffic) is a domestic IP address, the data roaming traffic is domestic traffic which is transmitted from the visited SGSN to the visited GGSN.

Figure 3:
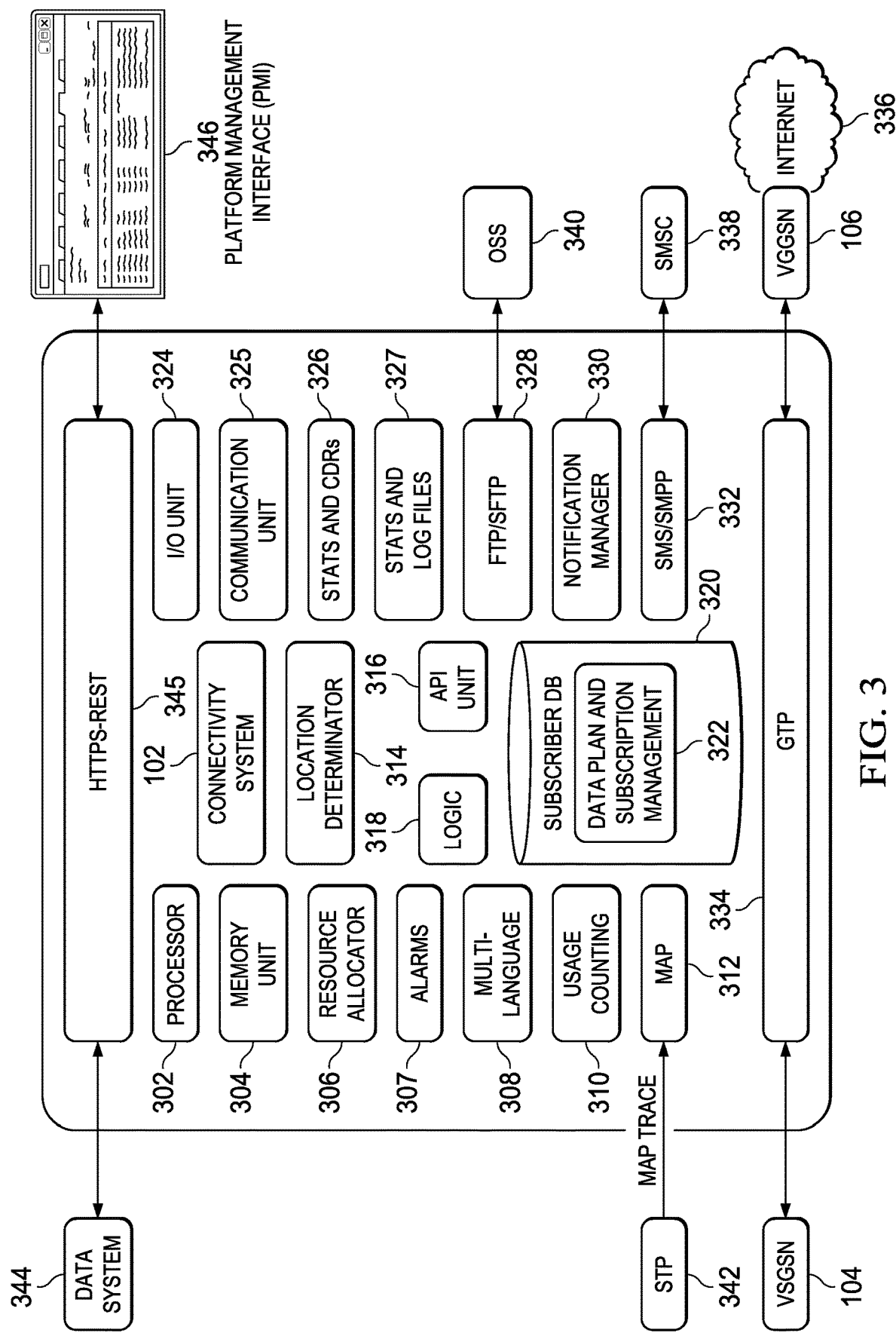
FIG. 3 is a diagram of a connectivity system, in accordance with some embodiments of the invention.

FIG. 3 illustrates an exemplary complex computing environment, in accordance with some embodiments of the invention. For example, the computing environment may be included in and/or utilized by the connectivity system, the mobile device, and/or any other system described herein. The computing environment and/or any of its units and/or sub-units described herein may include general hardware, specifically-purposed hardware, and/or specially purposed-software.

The computing environment may include, among other units, a processor 302, a memory unit 304, an input/output (I/O) unit 324, a communication unit 325, a resource allocator 306, a location determinator 314, and an API unit 316. As described herein, each of the processor, the memory unit, the I/O unit, and/or the communication unit may include and/or refer to a plurality of respective units, sub-units, and/or elements. The various units may be implemented entirely in hardware, entirely in software, or in a combination of hardware and software. Some of the units may be optional. Any software described herein may be specially purposed software for performing a particular function. In some embodiments, hardware may also be specially purposed hardware for performing some particular functions. Furthermore, each of the processor, the memory unit, the I/O unit, the communication unit, and/or the other units in FIG. 3, may be operatively and/or otherwise communicatively coupled with each other using a chipset such as an intelligent chipset. The chipset may have hardware for supporting connections in the computing environment and connections made to external systems from the computing environment. While various units of FIG. 3 are presented as separate units, some of the units may be comprised in other units. Additionally, some of the units may be optional. Additionally, one or more units may be coupled or connected (e.g., via a wired or wireless connection) to other units. For example, the processor may be connected to one or more other units in FIG. 3.

The processor may control any of the other units and/or functions performed by the units. Any actions described herein as being performed by a processor may be taken by the processor alone and/or by the processor in conjunction with one or more additional processors, units, and/or the like. Additionally, while only one processor may be shown in FIG. 3, multiple processors may be present and/or otherwise included in the computing environment. Thus, while instructions may be described as being executed by the processor, the instructions may be executed simultaneously, serially, and/or by one or multiple processors in parallel. In some embodiments, the processor may refer to any microprocessor, such as a specially purposed microprocessor. In some embodiments, the processor may refer to any type of processor, including a digital processor, an analog processor, a mixed analog-digital processor, etc.

In some embodiments, the processor may be implemented as one or more computer processor (CPU) chips and/or graphical processor (GPU) chips and may include a hardware device capable of executing computer instructions. The processor may execute instructions, codes, computer programs, and/or scripts. The instructions, codes, computer programs, and/or scripts may be received from and/or stored in the memory unit, the I/O unit, the communication unit, other units, and/or the like. As described herein, any unit may be utilized to perform any methods described herein. In some embodiments, the computing environment may not be a generic computing system, but instead may include customized units designed to perform the various methods described herein.

In some embodiments, the processor may include one or more other units such as those presented in FIG. 3, which may be operably coupled to each other. Therefore, while the units are presented as being separate from the processor, the memory unit, the I/O unit, and the communication unit, in some embodiments, one or more units may be located in at least one of the processor, the memory unit, the I/O unit, and the communication unit.

The location determinator may facilitate detection, generation, modification, analysis, transmission, and/or presentation of location information (e.g., of the mobile device). Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determinator may include various sensors, a radar, and/or other specifically-purposed hardware elements for enabling the location determinator to acquire, measure, and/or otherwise transform data of a mobile device into location information. In some embodiments, the location determination may be located in the processor.

The resource allocator may facilitate the determination, monitoring, analysis, and/or allocation of computing resources throughout the computing environment. As such, computing resources of the computing environment utilized by the processor, the memory unit, the I/O unit, the communication unit, and/or any other units of the computing environment, such as processing power, data storage space, network bandwidth, and/or the like may be in high demand at various times during operation. Accordingly, the resource allocator may be configured to manage the allocation of various computing resources as they are required by particular units of the computing environment. In some embodiments, the resource allocator may include sensors and/or other specially-purposed hardware for monitoring performance of each unit and/or sub-unit of the computing environment, as well as hardware for responding to the computing resource needs of each unit and/or sub-unit. In some embodiments, the resource allocator may utilize computing resources of a second computing environment separate and distinct from the computing environment to facilitate a desired operation. Therefore, in some embodiments any processor may be referred to as a load-balancing processor. Any apparatus described herein may be referred to as load-balancing apparatus or server. The term load-balancing may refer to allocation of computing resources to the various units of the computing environment.

For example, the resource allocator may determine a number of computing operations that need to be performed or executed by the computing environment. The resource allocator may then determine that the number of computing resources required by the computing operations meets and/or exceeds a predetermined threshold value. Based on this determination, the resource allocator may determine an amount of additional computing resources (e.g., processing power, storage space of a particular non-transitory computer-readable memory medium, network bandwidth, and/or the like) required by the processor, the memory unit, the I/O unit, the communication unit, and/or any sub-unit of the aforementioned units for enabling safe and efficient operation of the computing environment while supporting the number of simultaneous computing operations. The resource allocator may then retrieve, transmit, control, allocate, and/or otherwise distribute determined amount(s) of computing resources to each unit of the computing environment. In some embodiments, the allocation of computing resources of the resource allocator may include the resource allocator flipping a switch, adjusting processing power, adjusting memory size, partitioning a memory element, transmitting and/or receiving data, controlling one or more input and/or output devices, modifying various communication protocols, and/or the like. In some embodiments, the resource allocator may facilitate utilization of parallel processing techniques, e.g., for parallel computing operations. A computing operation may refer to any operation, function, method, process, etc., described in this disclosure. In some embodiments, the resource allocator may be located in the processor.

The memory unit and/or any of its sub-units described herein may include random access memory (RAM), read only memory (ROM), and/or various forms of secondary storage. RAM may be used to store volatile data and/or to store instructions that may be executed by the processor and/or any of the other units of the computing environment. For example, the data stored may be a command, a current operating state of the computing environment and/or any particular unit of the computing environment, an intended operating state of the computing environment and/or any particular unit of the computing environment, and/or the like. As a further example, data stored in the memory unit may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit may include one or more databases for storing any data described herein. Additionally or alternatively, one or more secondary databases located remotely from the computing environment may be utilized and/or accessed by the memory unit.

The API unit may facilitate deployment, storage, access, execution, and/or utilization of information associated with APIs of the computing environment. In some embodiments, the API unit may be located in the memory unit, while in other embodiments, the API unit may be located separate from the memory unit. The API unit may enable the various units of the computing environment to communicate with each other and/or perform computing operations described herein. Accordingly, the API unit may include API databases comprising information that may be accessed and/or utilized by applications and/or operating systems of other devices and/or computing environments. In some embodiments, each API database may be associated with a customized physical circuit included in the API unit. Additionally, each API database may be public and/or private, and so authentication credentials may be required to access information in an API database.

Any aspect of the memory unit may comprise any collection and arrangement of volatile and/or non-volatile components suitable for storing data. For example, the memory unit may comprise random access memory (RAM) devices, read only memory (ROM) devices, magnetic storage devices, optical storage devices, and/or any other suitable data storage devices. In particular embodiments, the memory unit may represent, in part, computer-readable storage media on which computer instructions and/or logic are encoded. The memory unit may represent any number of memory components within, local to, and/or accessible by a processor.

The I/O unit may include hardware and/or software elements for enabling the computing environment to receive, transmit, present data. For example, elements of the I/O unit may be used to receive, transmit, present data. In this manner, the I/O unit may enable the computing environment to interface with a human user. As described herein, the I/O unit may include an I/O device. The I/O device may facilitate the receipt, transmission, processing, presentation, display, input, and/or output of data as a result of executed processes described herein. In some embodiments, the I/O device may include a plurality of I/O devices. In some embodiments, the I/O device may include one or more elements of a signal system, a computing device, a server, and/or a similar device.

The I/O device may include a variety of elements that enable a user to interface with the computing environment. For example, the I/O device may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device may include a display, a screen, a projector, a sensor, a vibration mechanism, a light emitting diode (LED), a speaker, a radio frequency identification (RFID) scanner, and/or another element for presenting and/ or otherwise outputting data to a user. In some embodiments, the I/O device may communicate with one or more elements of the processor and/or the memory unit to execute operations described herein.

The communication unit may facilitate establishment, maintenance, monitoring, and/or termination of communications between the computing environment and other systems, units, etc. The communication unit may further enable communication between various units of the computing environment. The communication unit may facilitate establishment, maintenance, and/or termination of a communication connection between the computing environment and another device by way of a network or directly. For example, the communication unit may detect and/or define a communication protocol required by a particular network and/or network type. Communication protocols utilized by the communication unit may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), other wired or wireless protocols, and/or the like. In some embodiments, facilitation of communication between the computing environment and any other device, as well as any element internal to the computing environment, may include transforming and/or translating data from being compatible with a first communication protocol to being compatible with a second communication protocol. In some embodiments, the communication unit may determine and/or monitor an amount of data traffic to consequently determine which particular network protocol is to be used for transmitting and/or receiving data.

The communication device may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements of the computing environment be provided according to the structures disclosed herein may be included in integrated circuits or chipsets of any type, such as ROM, RAM (random access memory), DRAM (dynamic RAM), and video RAM (VRAM), PROM (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as processors (DSP), graphics system processors (GSP), synchronous vector processors (SVP), and image system processors (ISP) all represent sites of application of the principles and structures disclosed herein.

In some embodiments, implementation of any unit of any system described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

In some embodiments, the computing environment may be a connectivity system. The connectivity system may comprise a logic unit 318 that performs one or more operations. For example, the logic unit provides control instructions to an appropriate unit (e.g., the processor) as to when to transmit a message to a mobile device. The connectivity system may further comprise a subscriber database 320 which comprises records 322 of a subscribed mobile device (e.g., a mobile device associated with a data plan) and data plans for establishing data access via the connectivity system. As used herein, a data package may also be referred to as a data plan.

The connectivity system may further comprise a usage counting unit 310 that records the data usage of a subscribed mobile device. The connectivity system further comprises a notification manager unit 330 that sends notifications to the subscribed mobile device at the time of subscription activation, subscription expiry, and breach of data usage thresholds. The connectivity system further comprises a "stats & CDRs" unit 326 that generates CDRs for data usage and/or data operations and/or data-related activity performed by the subscribed mobile device. The connectivity system further comprises an alarms unit 307 that provides alerts when technical issues or problems are triggered with the operation of the connectivity system. The connectivity system further comprises a stats and log files unit 327 that generates statistics and log files to provide a record of activity associated with the connectivity system.

The connectivity system also comprises a GTP interface 334 that is connected to the VSGSN 104 (visited SGSN) and the VGGSN 106 (visited GGSN). The VGGSN is connected to a network such as the Internet 336. The connectivity system also comprises a SMS/SMPP interface 332 which transmits notification messages to the SMSC 338. The SMSC could be an operator of the mobile network (i.e., an operator SMSC) or a third party SMSC (i.e., a non-operator SMSC). The connectivity system may store a SMS/SMPP account. The connectivity system also comprises a FTP/SFTP interface 328 which collects CDRs and stats from the connectivity system (e.g., the stats and CDRs unit, the stats and log files unit, etc.) and transmit this data to the operator's OSS. The operator's OSS may use the data to present useful statistics (e.g., graphical statistics) and trends for the connectivity system.

The connectivity system further comprises a MAP interface 312. The MAP interface receives, from the STP 342, 'location update' and 'insert subscriber data' messages (either singly or together known as MAP Trace messages) for both IMSI attach and DATA/GPRS/LTE attach procedures of mobile devices that qualify to receive a data package option associated with the connectivity system. The 'location update' message may include location information associated with a mobile device. Either one or both of these messages may be used as inputs to the connectivity system to decide whether to perform one or more of the following actions: send a welcome message to a subscribed mobile device, send the subscribed mobile device a list of data package options associated with the connectivity system, confirm purchase of a data package, and/or provision a default data package quota (e.g., 50 MB) to allow the subscribed mobile device to access the connectivity system's web application and/or web site to purchase a data package, wherein the data package has a data quota greater than the default data package.

The connectivity system further comprises a HTTPS-REST interface 345. The HTTPS-REST interface allows the provisioning of the connectivity system's subscription via a mobile device application, webpage or website accessed on the mobile device. The HTTPS-REST may receive provisioning data from the data system 344. The functions of the HTTPS-REST interface include at least one of the following: data package management, quota management for the data package, define new data packages, inquire about data packages, update or deleted attributes of data packages, management of subscriber information (e.g., mobile device identification information, user identification information, etc.), add a new subscriber's account, add a new data package or additional data quota to an existing data package of an existing subscriber's account, inquire about a subscriber's account (e.g., how much available quota is left in the data package of the subscriber's account), update or reset list of data packages available to a subscriber, access usage information regarding a subscriber's data plan, etc.

Several types of customized hardware and/or software are further provided in this disclosure. The customized hardware and/or software may be integrated into any system described herein such as the connectivity system, the mobile device, etc. For example, customized hardware and/or software is provided to detect whether data roaming (or data access) functionality is enabled on the mobile device and whether the mobile device is associated with any active data package. As a further example, customized hardware and/or software is provided to enable data usage by the mobile device without generating any roaming traffic (e.g., international roaming traffic). As a further example, customized hardware and/or software is provided to enable data usage on the mobile device with a foreign mobile network without installing a SIM card associated with the foreign mobile network. As a further example, customized hardware and/or software is provided to replenish data quota associated with a previously established data package with a message response from the mobile device (e.g., to the connectivity system). In some embodiments, software as used in this disclosure may also be referred to as an application.

Figure 4:
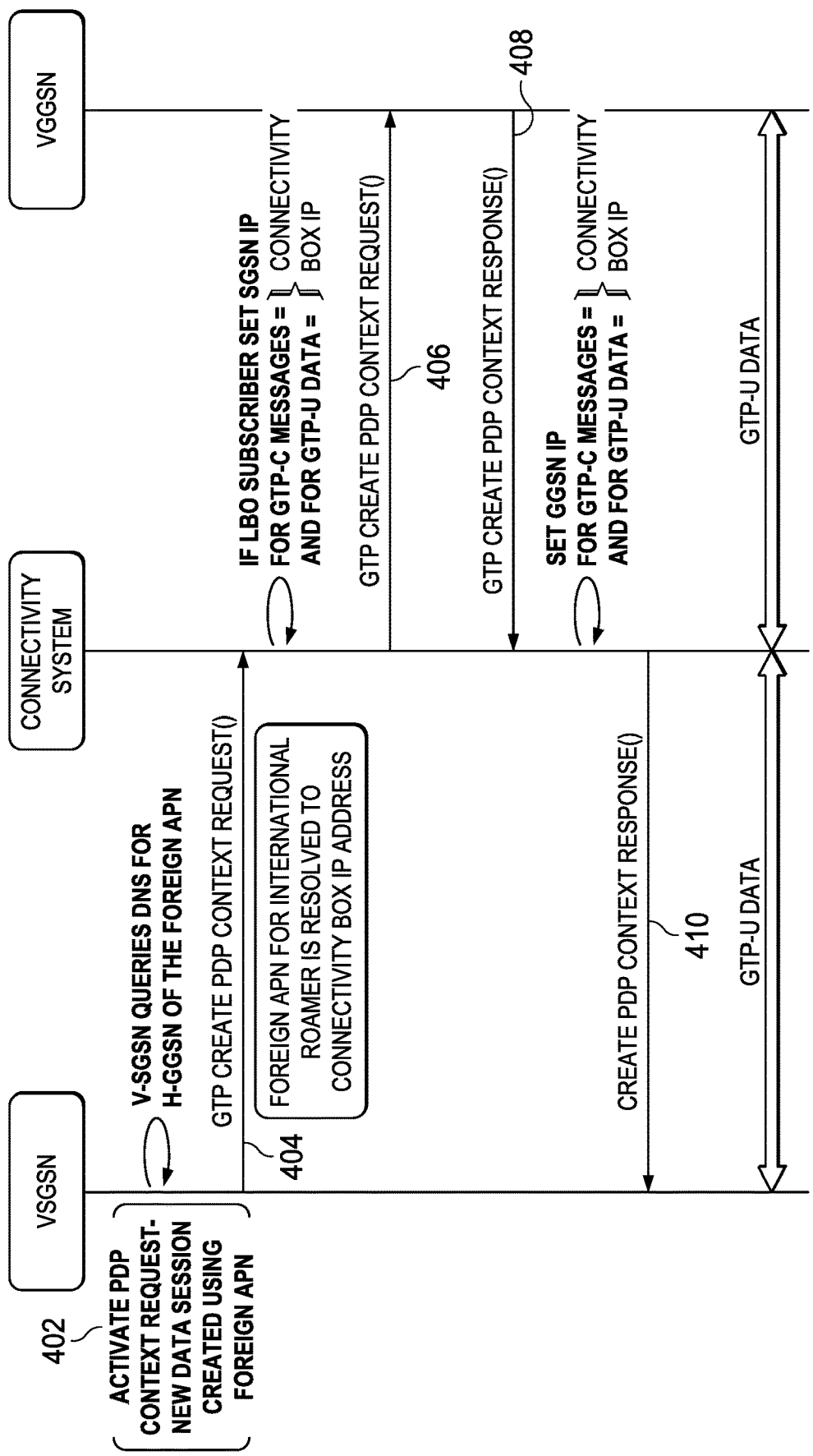
FIG. 4 is a flow diagram of a GTP call flow, in accordance with some embodiments of the invention.

FIG. 4 is a flow diagram of a GTP call flow, in accordance with some embodiments of the invention. An activate PDP context request is received (step 402) at the visited SGSN (VSGSN) from a mobile device, wherein the roaming functionality is activated for the mobile device. The mobile device is attempting to establish a data session using the mobile device's APN, which is a foreign APN. The visited SGSN queries (step 404) the operator DNS server for the identity of the home GGSN of the foreign APN. The visited SGSN (and/or the operator DNS server and/or the connectivity system, either singly or in combination) resolves (step 404) the foreign APN to a connectivity system IP address or a visited GGSN (VGGSN) IP address. The visited SGSN forwards (step 404) the GTP context request to the connectivity system.

The connectivity system examines the MSISDN (e.g., in the GTP context request) and hence the subscriber record. If an active subscription exists for the subscriber (i.e., LBO subscriber), the connectivity system forwards (step 406) the data session to the visited GGSN (e.g. forwards the GTP context request to the visited GGSN). An LBO subscriber may be any mobile device that has a data package subscription with the connectivity system. The connectivity system also sets (step 406) the SGSN IP address for GTP-C messages and for GTP-U data to the connectivity system IP address. The visited GGSN responds positively to the session request and allows the session out to a network such as the Internet. In response to receiving the GTP context request from the connectivity system, the visited GGSN transmits (step 408) a GTP context response to the connectivity system. The connectivity system also sets (step 408) the GGSN IP address for GTP-C messages and for GTP-U data to the connectivity system IP address. The connectivity system transmits (step 410) the GTP context response to the visited SGSN. An IP address as used in this disclosure may refer to any type of network address.

For data sessions conducted via the connectivity system, the connectivity system remains in the data path and acts as a GTP proxy between the SGSN and the GGSN for the connectivity system's data sessions. The connectivity system changes the IP addresses (e.g., for GTP-C messages and for GTP-U data) to appear as the SGSN to the GGSN, and as the GGSN to the SGSN.

For data sessions conducted using the mobile device that are not routed through the connectivity system, the connectivity system GTP proxy steps out of the traffic path by setting the SGSN and GGSN IP addresses as the actual SGSN and GGSN network node addresses during the GTP-C Activate PDP context procedure (e.g., request and response procedures). Consequently, the connectivity system does not receive any GTP-C signaling for the course of that data session, and the GTP-U data is transmitted directly from the SGSN to the GGSN.

Figure 5:
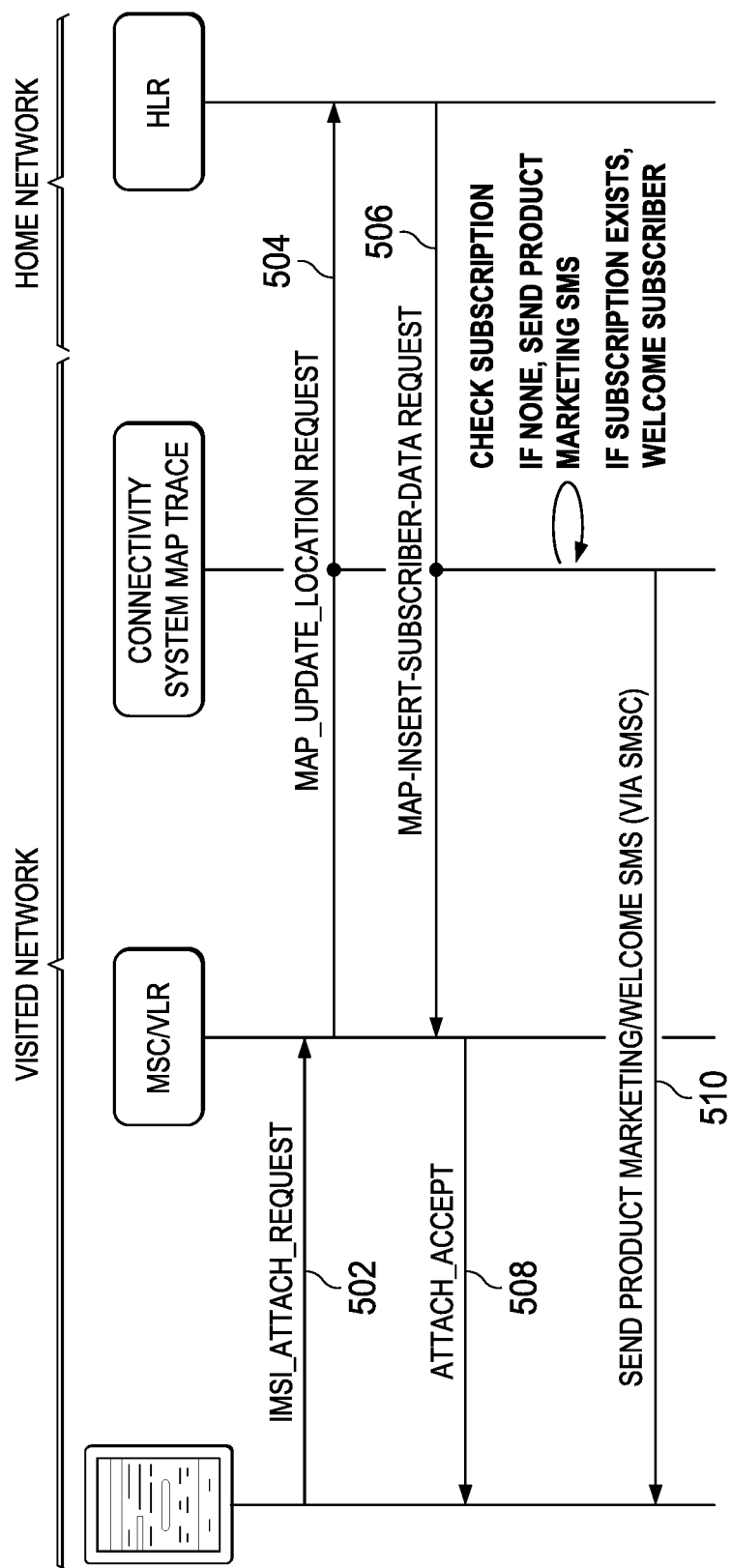
FIG. 5 is a flow diagram of a IMSI attach call flow, in accordance with some embodiments of the invention.

FIG. 5 is a flow diagram of a IMSI attach call flow, in accordance with some embodiments of the invention. The VLR receives (step 502) an IMSI attach request from the mobile device. The VLR transmits (step 504) a MAP trace of an update location request to the connectivity system, which, in turn, transmits the update location request to the HLR (e.g., via an international signaling link). The HLR transmits (step 506) a MAP of an insert subscriber data message to the connectivity system (e.g., via an international signaling link). Upon receiving at least one of the update location request and/or the insert subscriber data message, the connectivity system checks (step 510) whether the mobile device has a subscription to the connectivity system. If no subscription exists, the connectivity system transmits (step 510) a message to the mobile device informing the user of the mobile device the option of establishing a data package subscription. If a subscription exists, the connectivity system transmits (step 510) a welcome message to the mobile device. The VLR transmits (step 508) an attach acceptance (in response to the IMSI attach request) to the mobile device. The attach acceptance may be transmitted at least one of before or after the update location request is transmitted from the VLR to the connectivity system and/or the insert subscriber data message is transmitted from the connectivity system to the VLR. No non-roaming signal traffic is transmitted through the connectivity system. In some embodiments, at least some MAP messages are not transmitted through the connectivity system.

In some embodiments, the connectivity system executes operations (e.g., logical operations such as those presented in FIG. 7) to determine if the mobile device (e.g., a mobile device that has subscribed to a data package) should receive a notification, and the type of notification to be received by the mobile device. The connectivity system may forward the notification to the operator SMSC for transmission to the mobile device. As an example, a welcome message may not be transmitted to the mobile device for a subsequent IMSI attach request received from the mobile device after a first welcome message is transmitted to the mobile device after the first IMSI attach request is received from the mobile device. A subsequent IMSI attach request may be received from the mobile device if the mobile device is reset, powered off and on, etc., after the first welcome message is transmitted to the mobile device.

Figure 6:
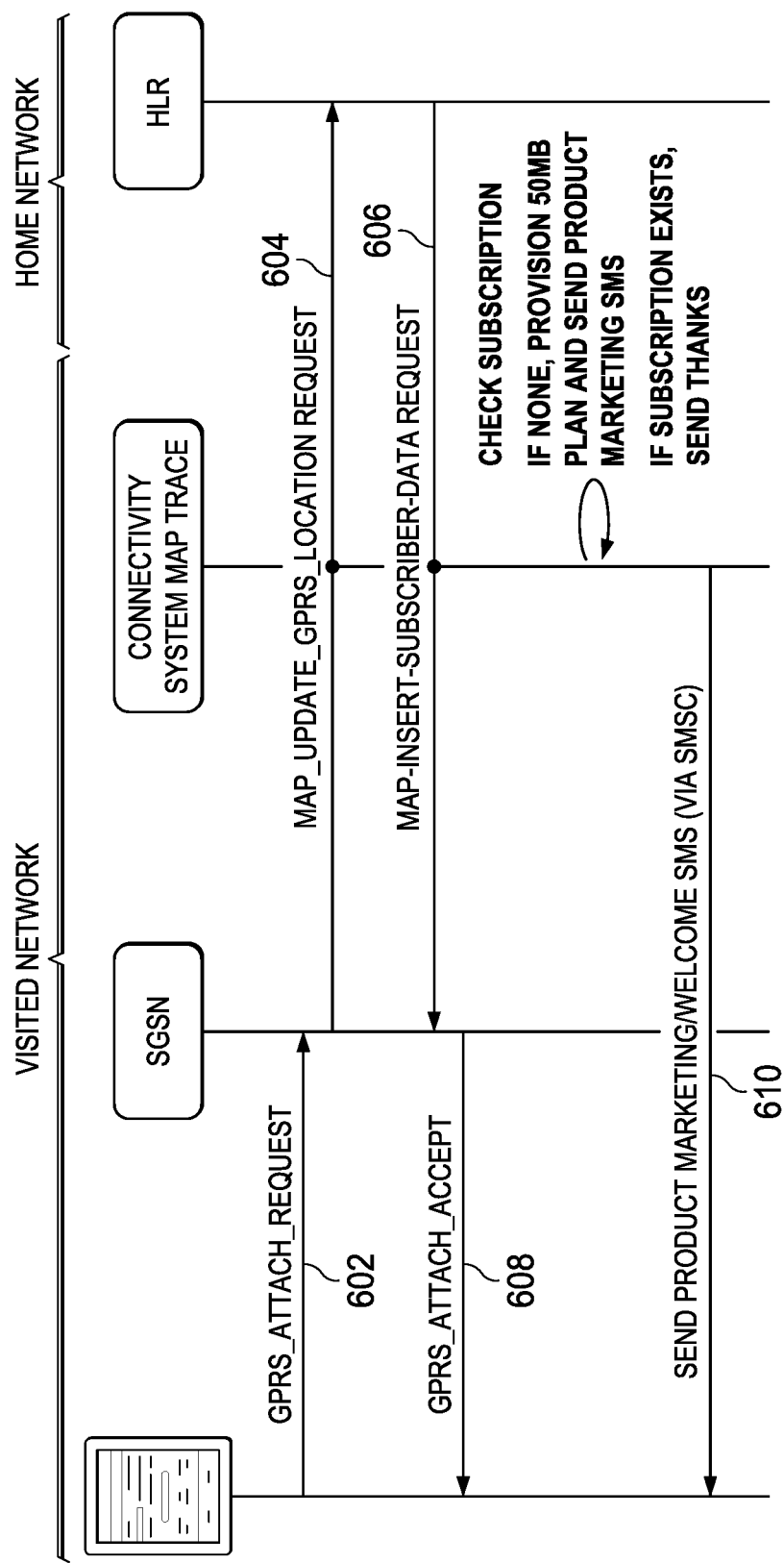
FIG. 6 is a flow diagram of a GPRS attach call flow, in accordance with some embodiments of the invention.

FIG. 6 is a flow diagram of a GPRS attach call flow, in accordance with some embodiments of the invention. The SGSN receives (step 602) a GPRS attach request from the mobile device. The SGSN transmits (step 604) a MAP trace of an update GPRS location request to the connectivity system, which, in turn, transmits the update GPRS location request to the HLR (e.g., via an international signaling link). The HLR transmits (step 606) a MAP of an insert subscriber data message to the connectivity system (e.g., via an international signaling link). Upon receiving at least one of the update location request and/or the insert subscriber data message, the connectivity system checks (step 610) whether the mobile device has a subscription to the connectivity system. If no subscription exists, the connectivity system transmits (step 610) a message to the mobile device informing the user of the mobile device the option of establishing a data package subscription. If a subscription exists, the connectivity system transmits (step 610) a welcome message to the mobile device. The SGSN transmits (step 608) an attach acceptance (in response to the GPRS attach request) to the mobile device. The attach acceptance may be transmitted at least one of before or after the update location request is transmitted from the SGSN the connectivity system and/or the insert subscriber data message is transmitted from the connectivity system to the SGSN. No non-roaming signal traffic is transmitted through the connectivity system. In some embodiments, at least some MAP messages are not transmitted through the connectivity system.

In some embodiments, the connectivity system executes operations (e.g., logical operations such as those presented in FIG. 7) to determine if the mobile device (e.g., a mobile device that has subscribed to a data package) should receive a notification, and the type of notification to be received by the mobile device. In some embodiments, the connectivity system executes further operations to determine whether a data package plan (e.g., a 50 MB plan) should be provisioned to the mobile device (or an account associated with the mobile device) to allow the mobile device to access the connectivity system's web application or web page. The connectivity system may forward the notification to the operator SMSC for transmission to the mobile device.

Figure 7:
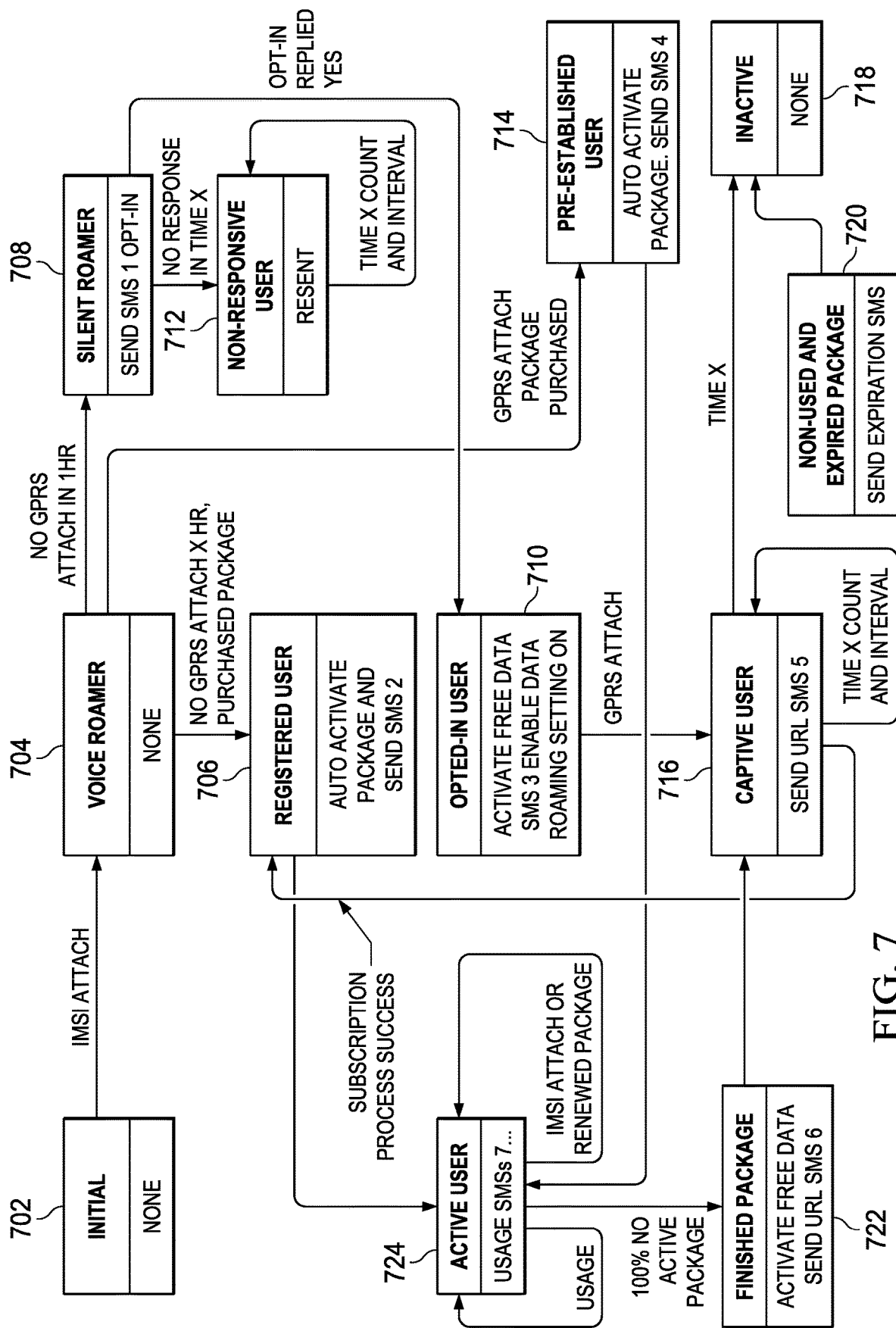
FIG. 7 is a diagram of a process flow for a connectivity system and a mobile device, in accordance with some embodiments of the invention.

FIG. 7 is a process flow for a connectivity system and a mobile device, in accordance with some embodiments of the invention. In some embodiments, the connectivity system may refer to the connectivity system or any other system in communication with, either directly or in directly, with the connectivity system. The other system may be in direct or indirect (via one or more other systems) wired or wireless communication with the connectivity system. In some embodiments, any reference to a mobile device may additionally or alternatively refer to at least one of a user associated with the mobile device, an account associated with the mobile device, or a computing device in communication with the mobile device.

A user may board a flight in a first area (e.g., in a first country) where the user has an active mobile network (or cellular network) subscription and land in a second area (e.g., in the first country or in a second country) where the user does not have an active mobile network subscription or where the cellular network associated with the active subscription does not provide coverage. Once the user lands in the second area, the user may turn on the mobile device. Prior to the mobile device being turned on, it is in an initial state (state 702). Once the mobile device is turned on, the IMSI attach process starts and the new state of the mobile device is a voice roamer state (state 704). This is the state to detect registered connectivity system users (registered users) or potential connectivity system users (silent roamers). Data access provided by the connectivity system may be used by the registered users or silent roamers. The GPRS attach process is executed in parallel with the IMSI attach process. If there is no GPRS attachment in a certain number of hours (e.g., 1 hour) from the point in time when the mobile device is detected or from any other reference time, then the new state of the mobile device is a silent roamer state (state 708). If there is no GPRS attachment in the certain number of hours and a data package is detected as being associated with (e.g., previously purchased) by the mobile device, then the new state of the mobile device is a registered user state (state 706). In some embodiments, a data package for a mobile device may have been previously purchased by a different mobile device or computing device. If there is a GPRS attachment in the certain number of hours, and a data package is detected as being associated with the mobile device, then the new state of the mobile device is a pre-established user state (state 714).

If the mobile device enters the silent roamer state, the mobile device receives an opt-in message (e.g., "If you would like to use the connectivity system's data, please reply as YES"). The message may be transmitted as an SMS or via any other transmission mechanisms described herein.

If the mobile device responds with a "YES," then the new state of the mobile device is an opted-in user state (state 710). If the mobile device does not respond in a certain amount of time (e.g., time X), then the new state of the mobile device is a non-responsive user state (state 712).

In the non-responsive user state, the mobile device receives an "opt-in" message (e.g., an SMS) a certain number of times, wherein a certain interval is lapsed between each transmission of the message. Each interval may be of the same or different duration. If the mobile device responds with a "YES," then the new state of the mobile device is an opted-in user state. If there is no response a certain duration after the final "opt-in" message is transmitted to the mobile device, no further messages will be transmitted to the mobile device.

In the opted-in user state, a certain amount of free data is assigned to the mobile device. The connectivity system may transmit a message to the mobile device requesting activation of the roaming setting on the mobile device in order for the mobile device to obtain data access using the connectivity system. The mobile device may use the free data to access a web application or website associated with the connectivity system and purchase a data package. The state of the mobile device is now that of a captive user state (state 716).

In the captive user state, the mobile device receives a purchase message that includes a link (e.g., a URL) to an application or a page associated with the connectivity system's data access service. Upon selecting the click (or clicking the link), the application or page is displayed on the mobile device display. The application or page may display one or more purchase options. Each purchase option may be associated with a different data access quota, a different data access period (e.g., 24 hours), a different data access area (e.g., an airport, a neighborhood, a store, a library, an office, a coffee shop, a rectangular area of 50×50 meters, a circular area with a radius of 50 meters, etc.) and/or a different data access price. The user of the mobile device may select one of the options. The user may then enter payment information or the mobile device may automatically fill in payment information, and once the payment process has been approved, the state of the mobile device becomes a registered user state. An external payment tokenization system may be used to collect the user's payment information (e.g., input by the user) and process the payment information. The connectivity system may not store any payment information input by the user. In some embodiments, the external payment tokenization system may store the payment information. If the user does not purchase the package, the mobile device receives the purchase message a certain number of times, wherein a certain interval is lapsed between each transmission of the message. Each interval may be of the same or different duration. If the mobile device purchases the package, then the new state of the mobile device is a registered user state. If there is no response a certain duration after the final purchase message is transmitted to the mobile device, no further messages will be transmitted to the mobile device.

In the registered user state, the mobile device is ready for data access. The mobile device receives a messages informing the user that the mobile device is ready to be used and that the roaming setting on the mobile device should be activated. The mobile device now enters the active user state (state 724).

In the active user state, the mobile device may be used for accessing and using web applications and web pages. The connectivity system may transmit a message to the mobile device when the mobile device has used up a certain data quota threshold associated with the purchased data package. The message may prompt the user to renew the data package. For example, the message may include a renewal link. When the renewal link is selected, the mobile device display may be directed to a renewal application or a renewal webpage. In some embodiments, the user may renew with a single click (or single selection). In some embodiments, the user may renew by transmitting a renewal message from the mobile device (e.g., a text message such as an SMS). In other embodiments, the user may have to perform the payment process again to renew the package. If the mobile device is reset or if the mobile device is turned off and then turned on while the data package conditions have not been exhausted (e.g., data quota used, data package validity period expired, mobile device has moved outside of valid usage area, etc.), the state of the mobile device remains as an active user state. If the data package conditions have been exhausted and the user does not renew the package prior to the exhaustion, the state of the mobile device becomes the finished package state (state 722). In some embodiments, the user may monitor used data or remaining data and usage information (e.g., type of applications used, duration of data session, etc.) through a web application and/or a web page associated with the connectivity system.

In the pre-established user state, the mobile device is ready for using data associated with a pre-purchased data package. The connectivity system transmits a message to the mobile device informing the user that the mobile device can be used for data access (e.g., for accessing the Internet). Either prior or after transmission of the message, the state of the mobile device becomes the active user state.

In the finished package state, the mobile device has no remaining data for data access. Therefore, the connectivity system assigns a certain amount of free data to the mobile device. The connectivity system transmits a message to the mobile device informing the user that the user has no remaining data and that the user needs to renew the data package in order to regain data access. The message may also include a link. Upon selecting the link, the mobile device directs the mobile device display to a connectivity system's application or website to renew the data package. The state of the mobile device becomes a captive user state.

A mobile device enters a non-used and expired package state (state 720) if the mobile device does not use the data package for accessing data for a certain period or if the period of validity of the data package has expired. Upon changing the state of the mobile device to the non-used and expired package stage, the connectivity system transmits a message to the mobile device informing the user that the data package has not been used for a certain period and/or that the period of validity of the data package has expired. Either prior to or after transmitting the message to the mobile device, the state of the mobile device becomes an inactive state (state 718). In the inactive state, no messages are transmitted from the connectivity system to the mobile device. In some embodiments, even though operations are indicated as being performed by the connectivity system (e.g., transmitting and/or receiving messages), the operations may merely be initiated by the connectivity system and may be performed by other systems or devices in communication with the connectivity system.

Figure 8:
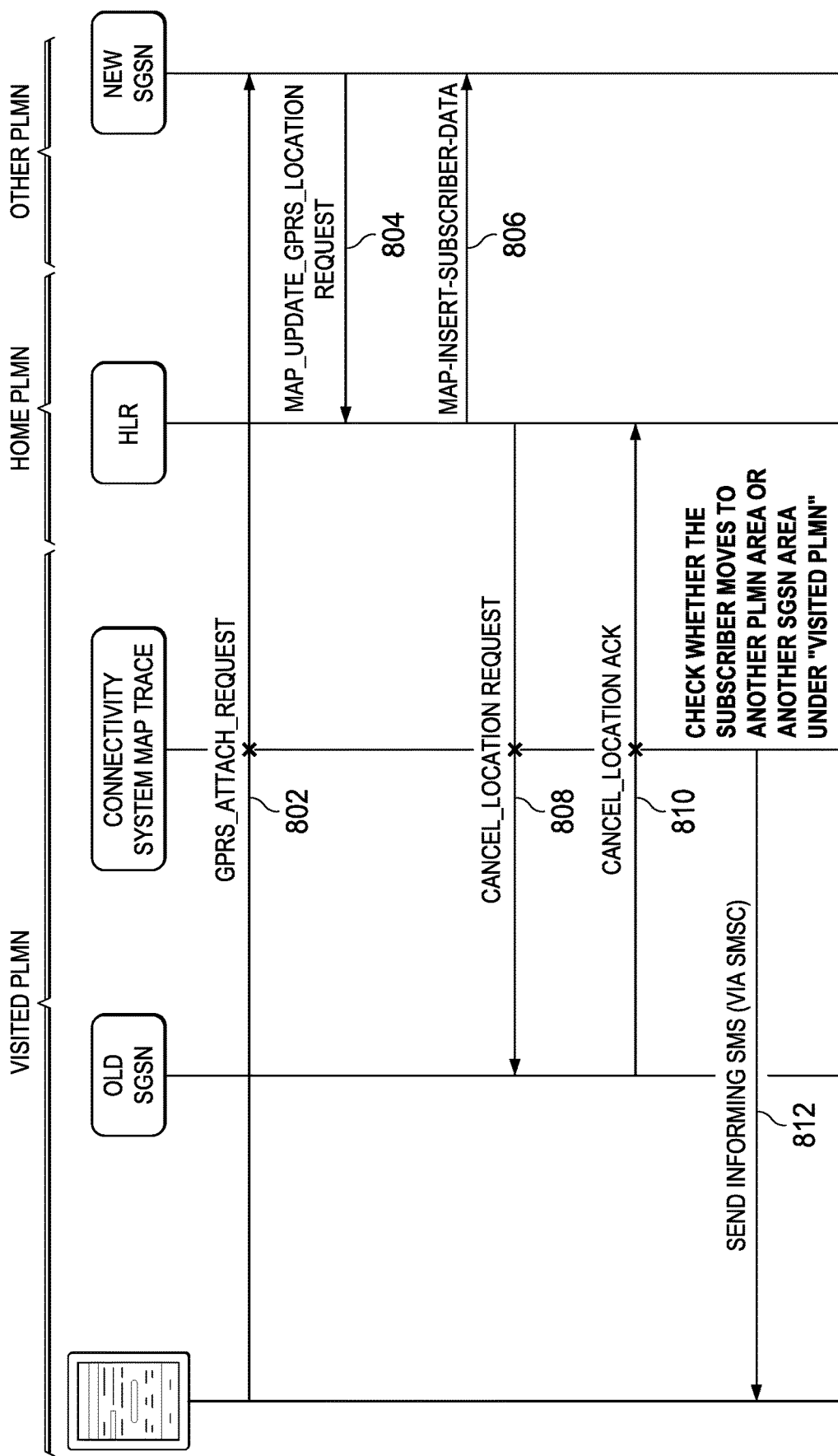
FIG. 8 is a flow diagram of a cancel location procedure, in accordance with some embodiments of the invention.

FIG. 8 is a flow diagram of a cancel location procedure, in accordance with some embodiments of the invention. The connectivity system receives (step 802) a GPRS attach request from the mobile device. The connectivity system sends the GPRS attach request to the new SGSN. Alternatively, the GPS attach request is directly transmitted from the mobile device to the new SGSN. Any transmissions described herein may be made by a signaling link. The SGSN transmits (step 804) a MAP trace of an update GPRS location request to the HLR, which, in turn, transmits a MAP of an insert subscriber data message (step 806) to the connectivity system (e.g., via an international signaling link).

At step 808, the connectivity system receives a cancel location request from at least one of the HLR or MAP trace and checks the IMSI. In response to receiving the cancel location request, the connectivity system sends a cancel location acknowledgment to the HLR (step 810). If within a predetermined duration, there is no "GPRS update location" or "routing area update" message within the visited network for the IMSI, then the connectivity system determines that the mobile device has gone to another PLMN. During this predetermined duration, the connectivity system may check whether the mobile device moves to another PLMN area or another SGSN area associated with the visited PLMN. Upon making the determination that the mobile device has gone to another PLMN, the connectivity system sends a message to the mobile device warning the mobile device that data traffic consumed from the time of making the determination and/or sending the message may be charged according to certain charge schedule (step 812).

Figure 9:
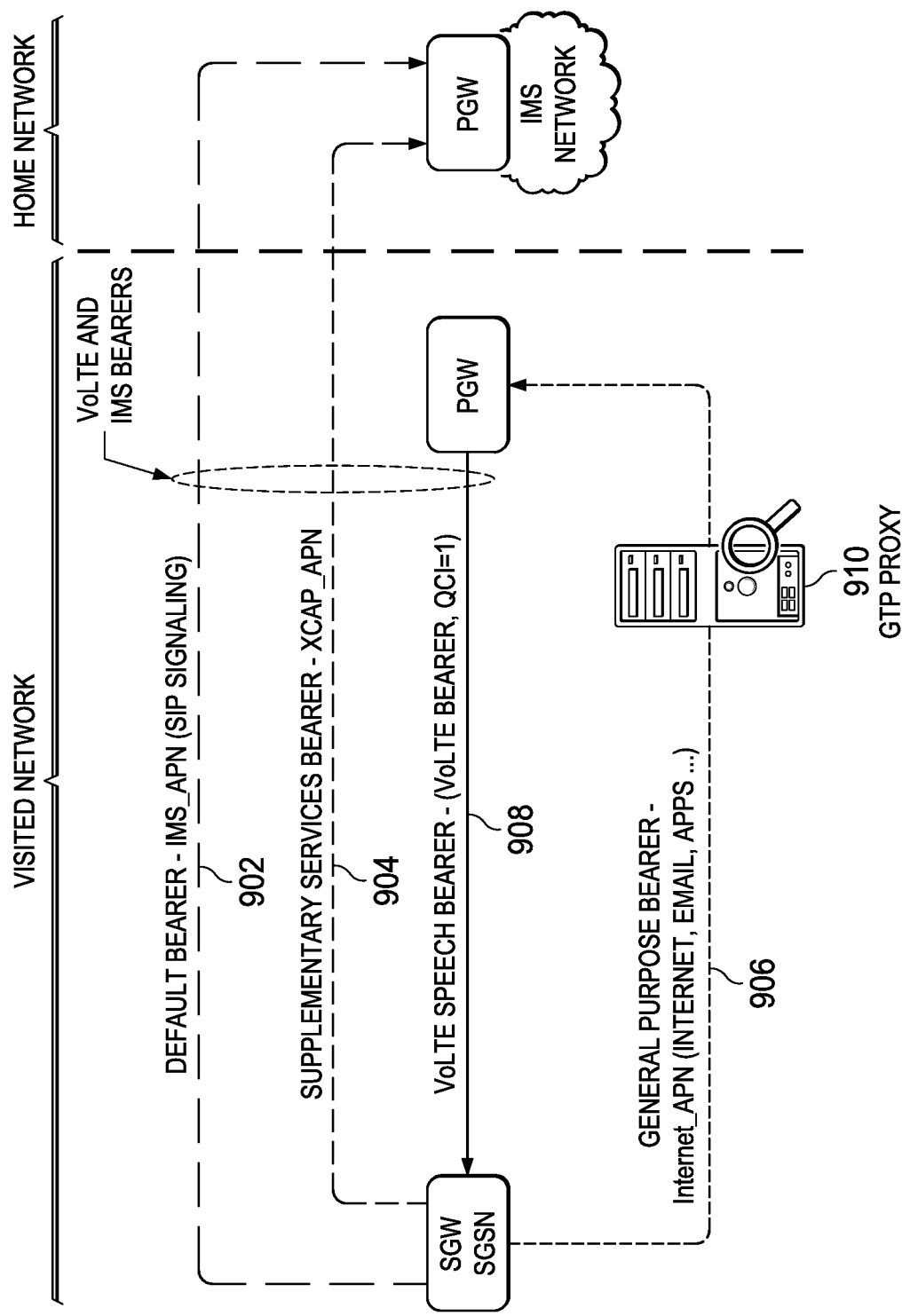
FIG. 9 is a flow diagram of a LTE connectivity system embodiment, in accordance with some embodiments of the invention.
Figure 10A:
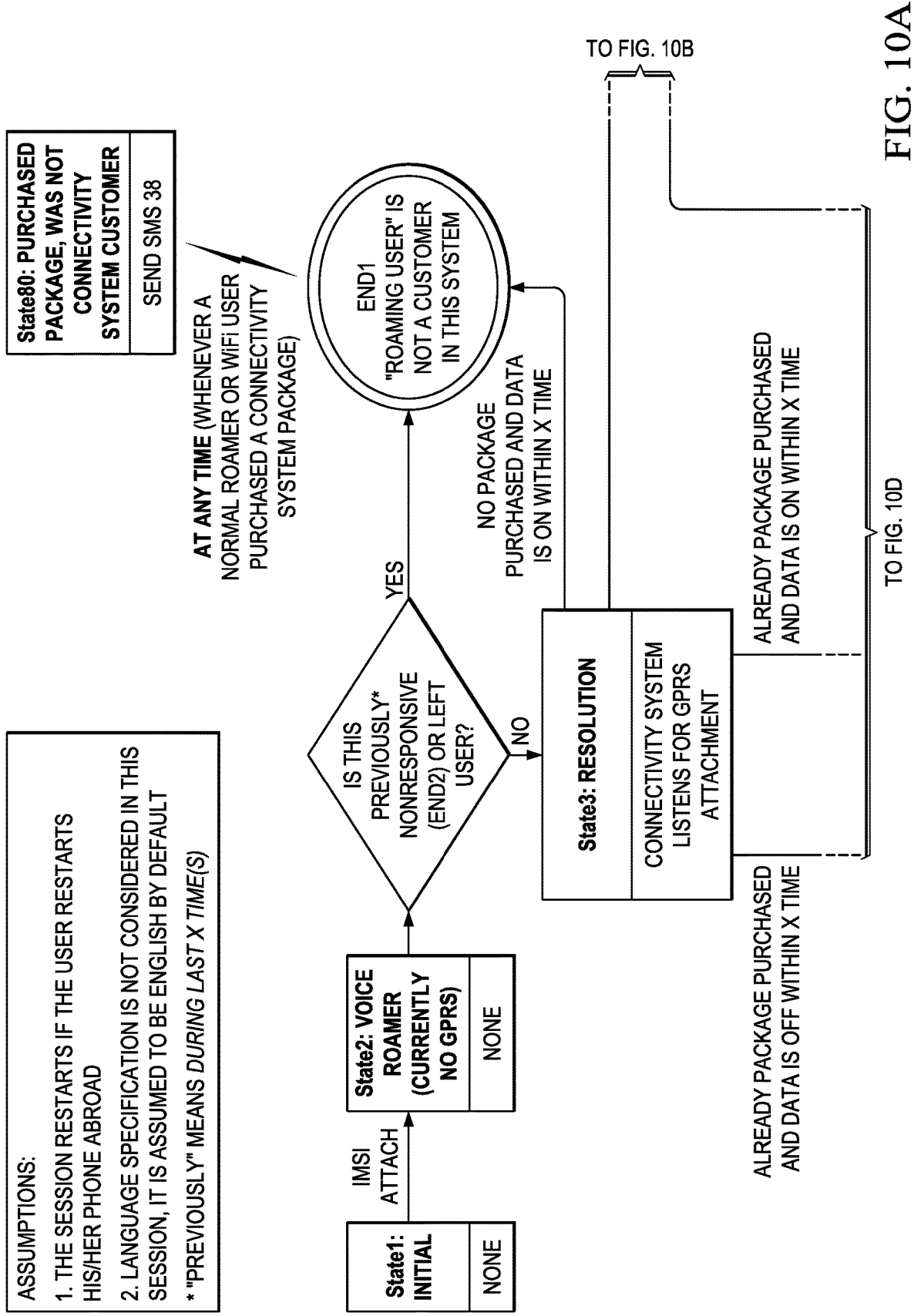
FIGS. 10A to 10H are a process flow for a connectivity system and a mobile device, in accordance with some embodiments of the invention.
Figure 10B:
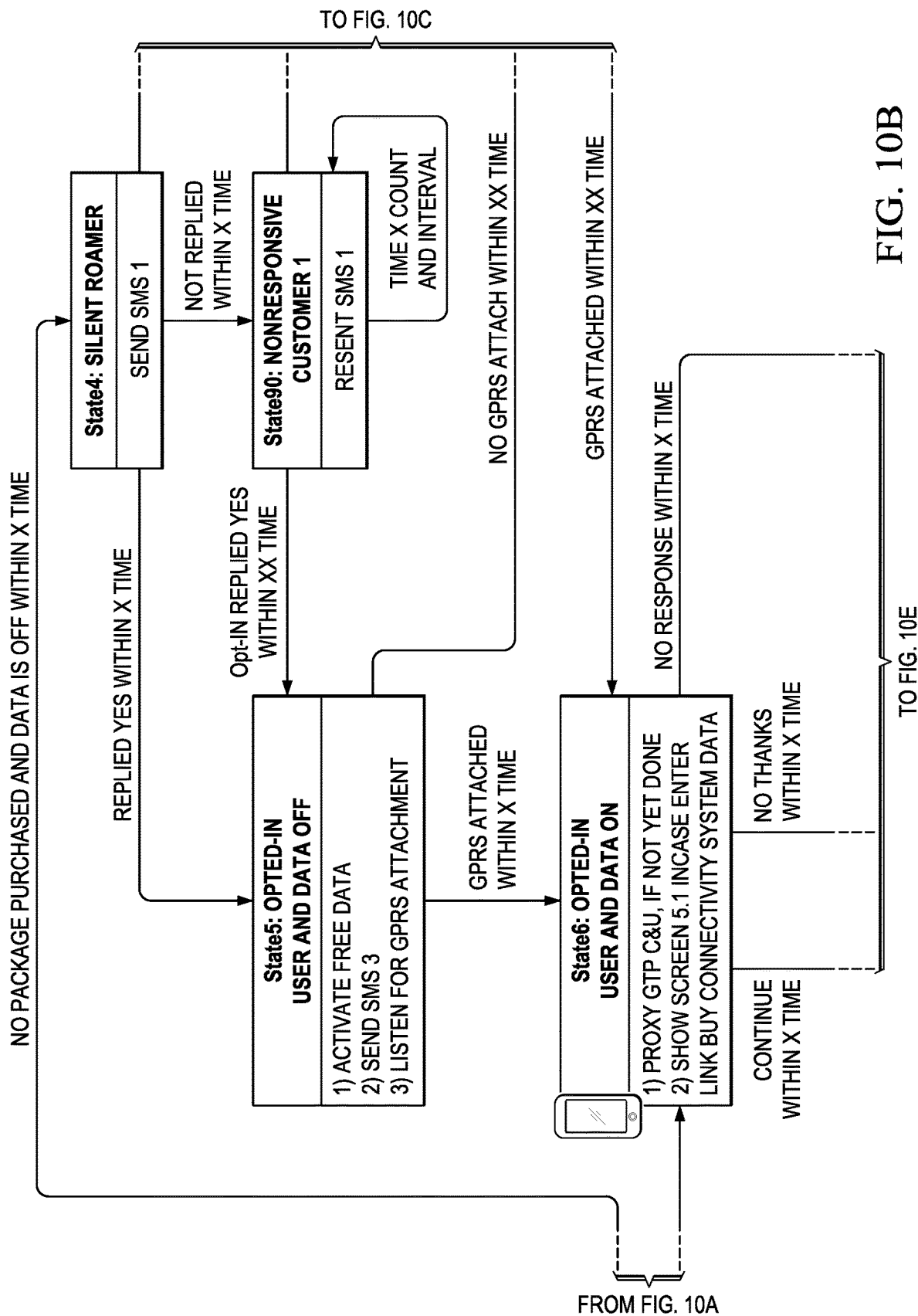
Figure 10C:
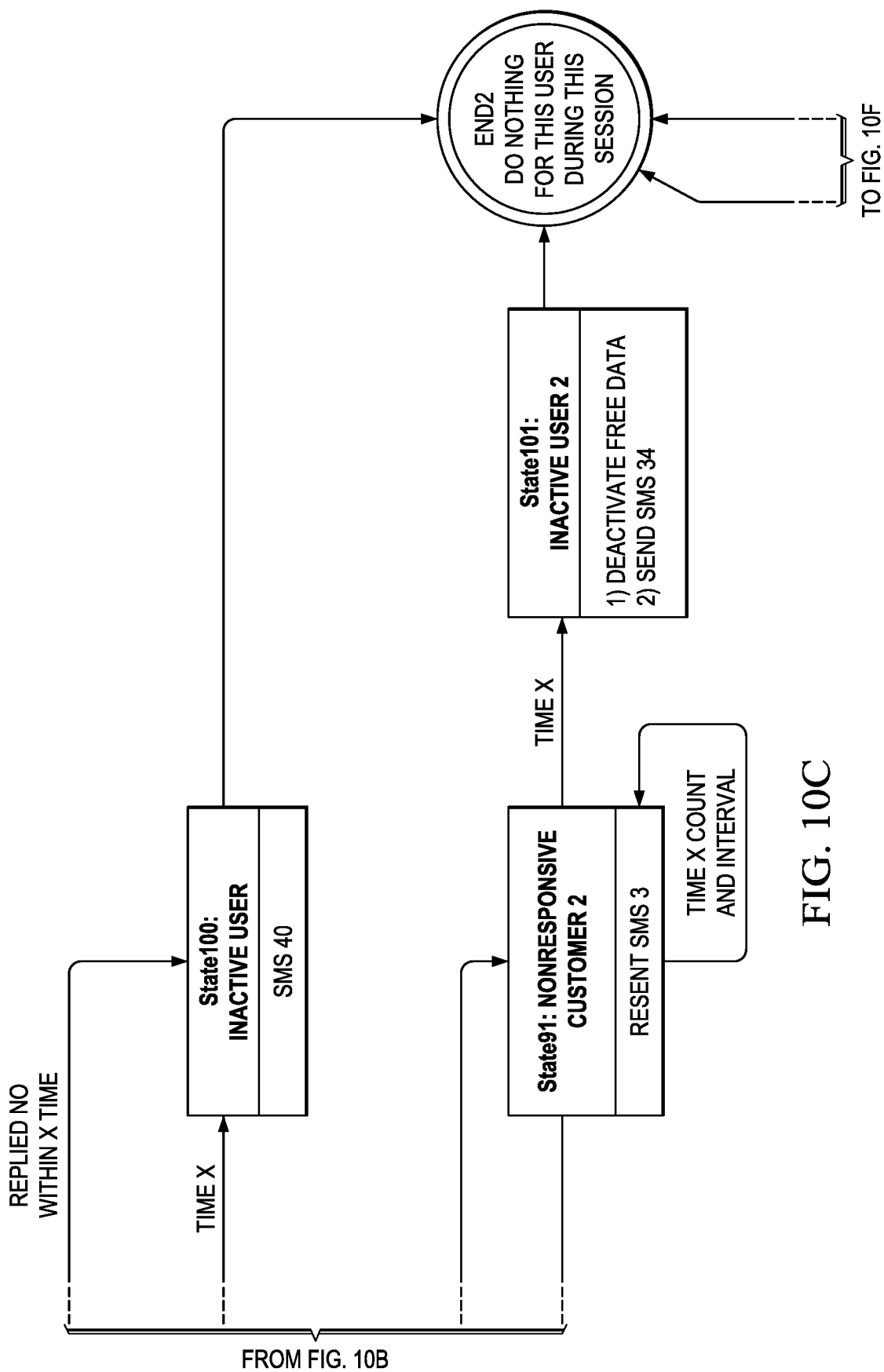
Figure 10D:
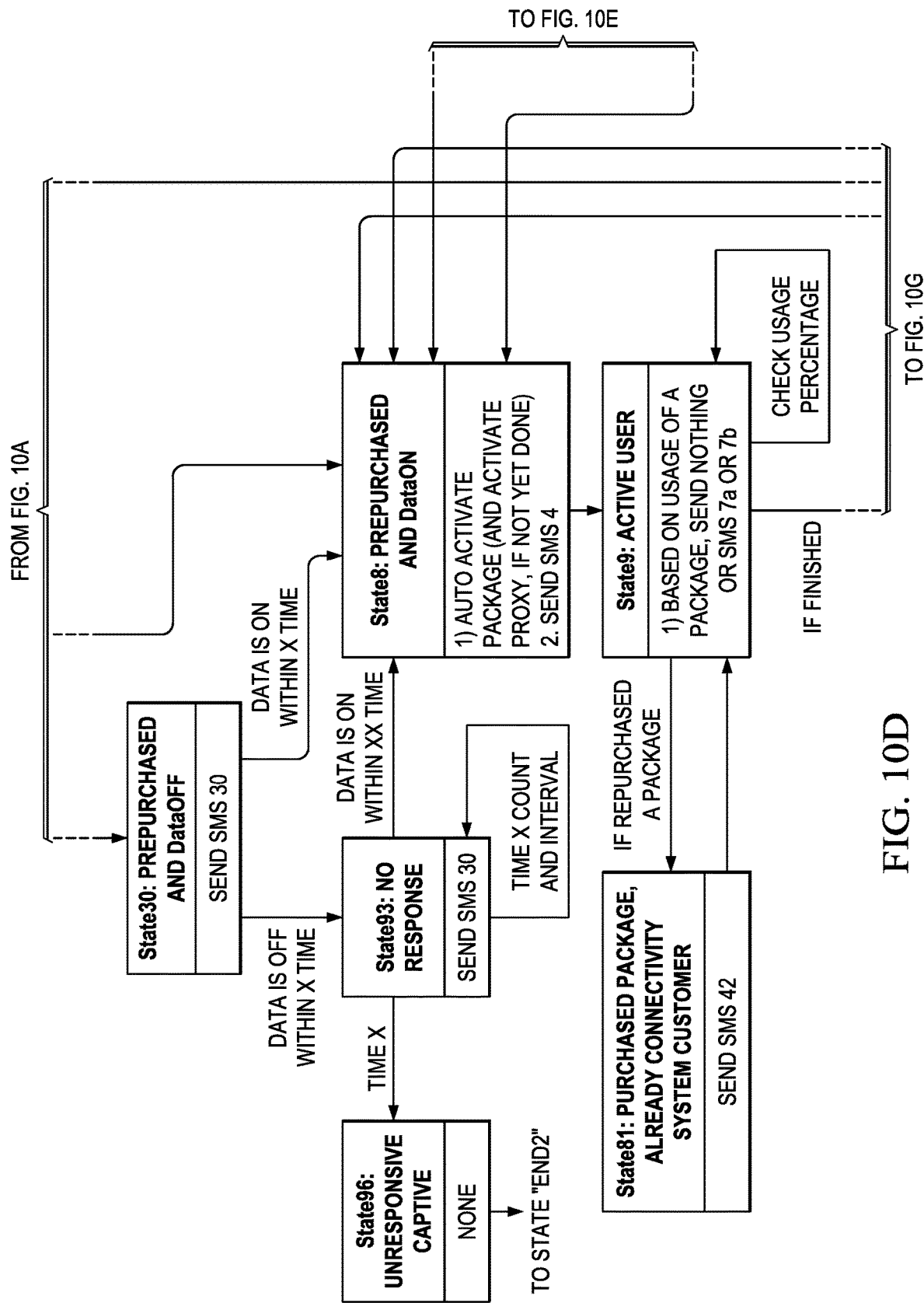
Figure 10E:
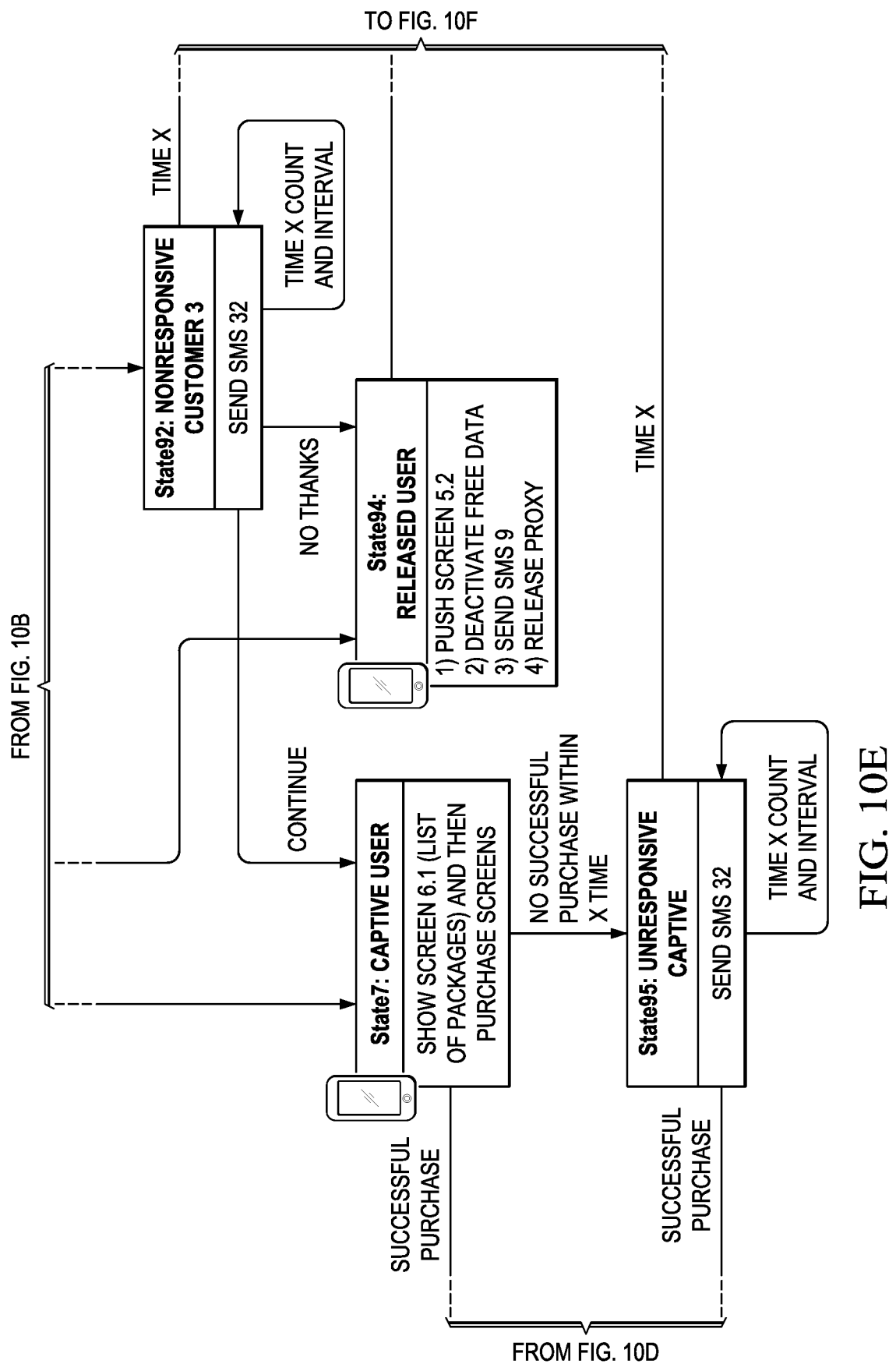
Figure 10F:
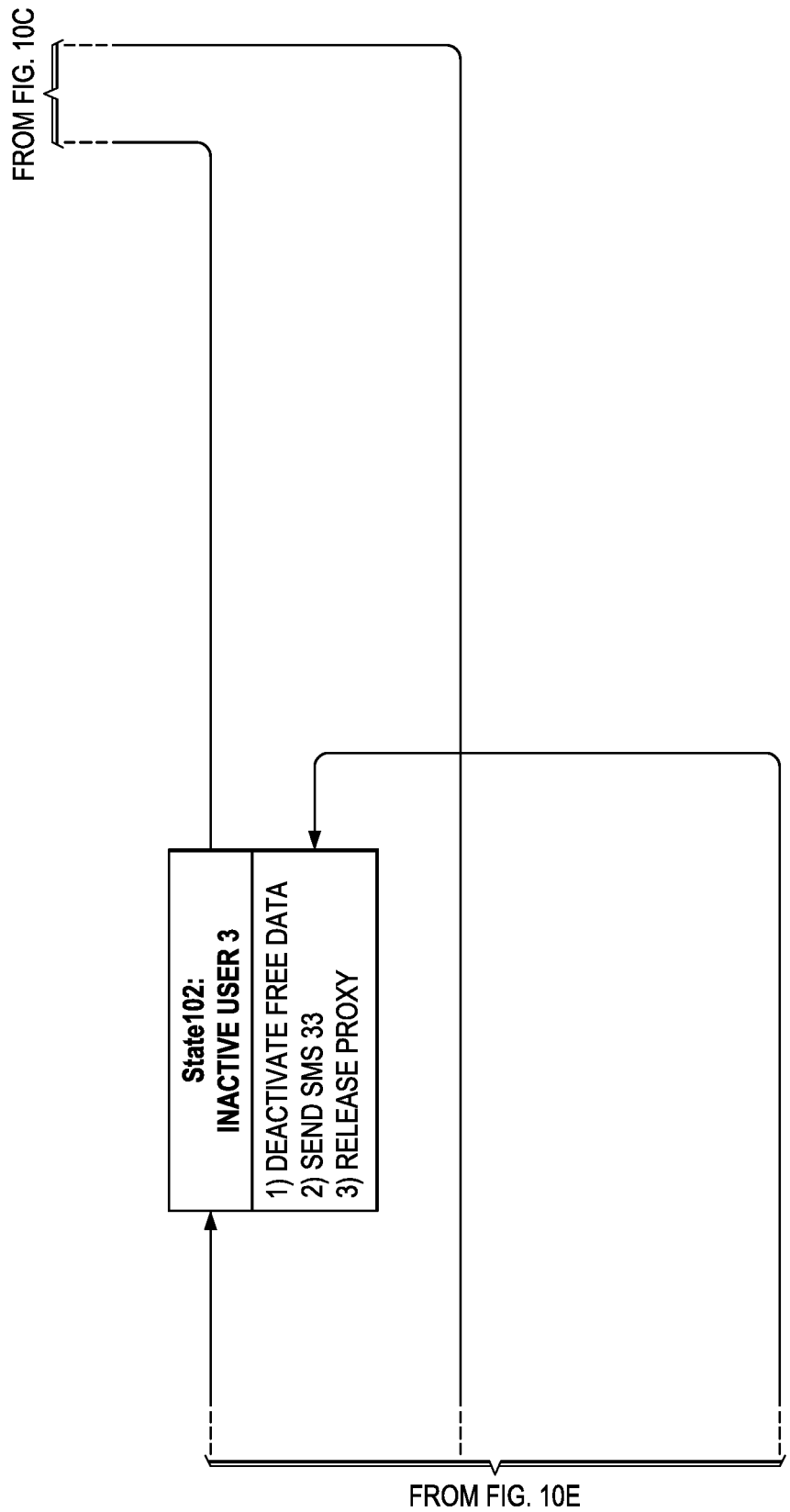
Figure 10G:
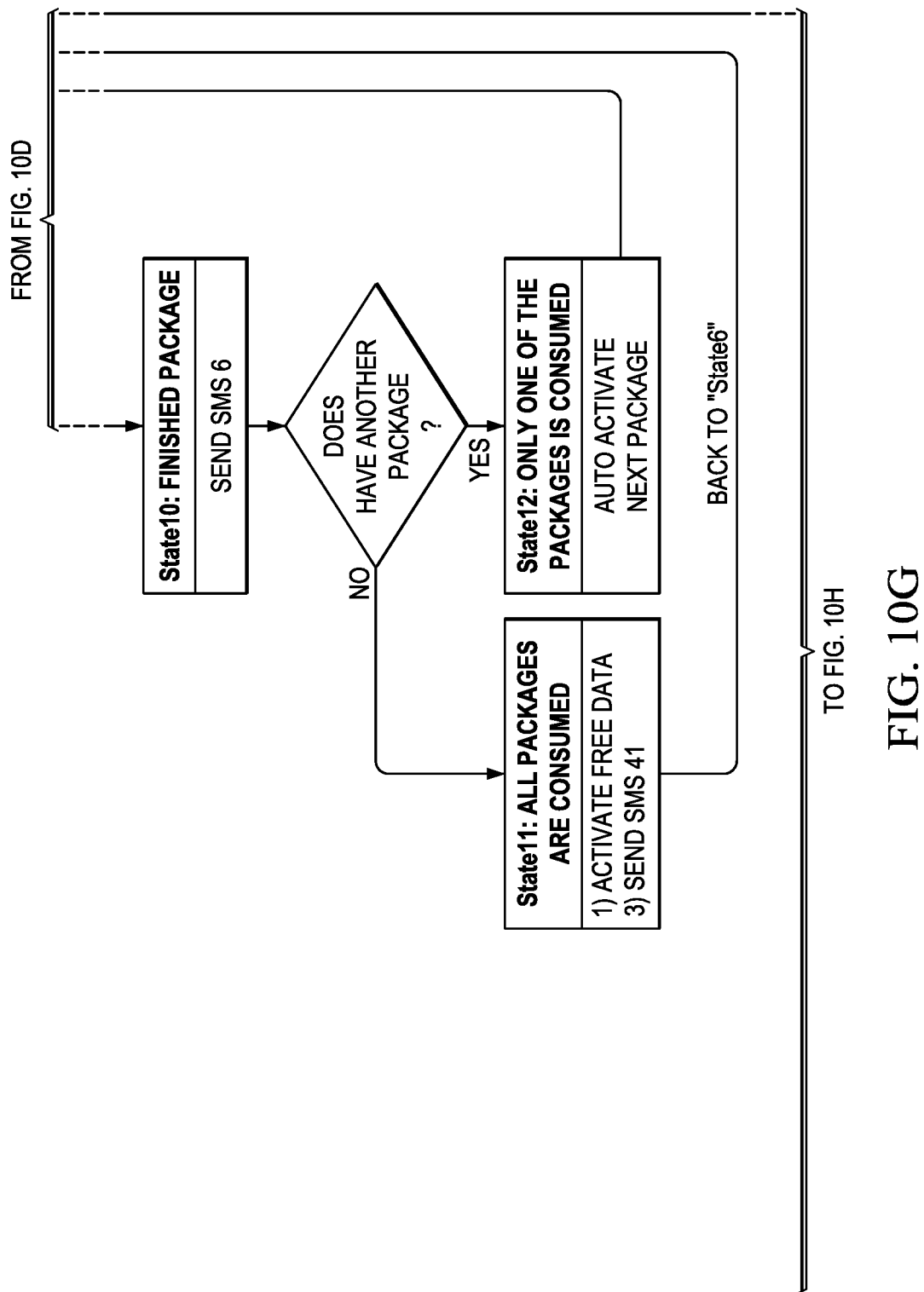
Figure 10H:
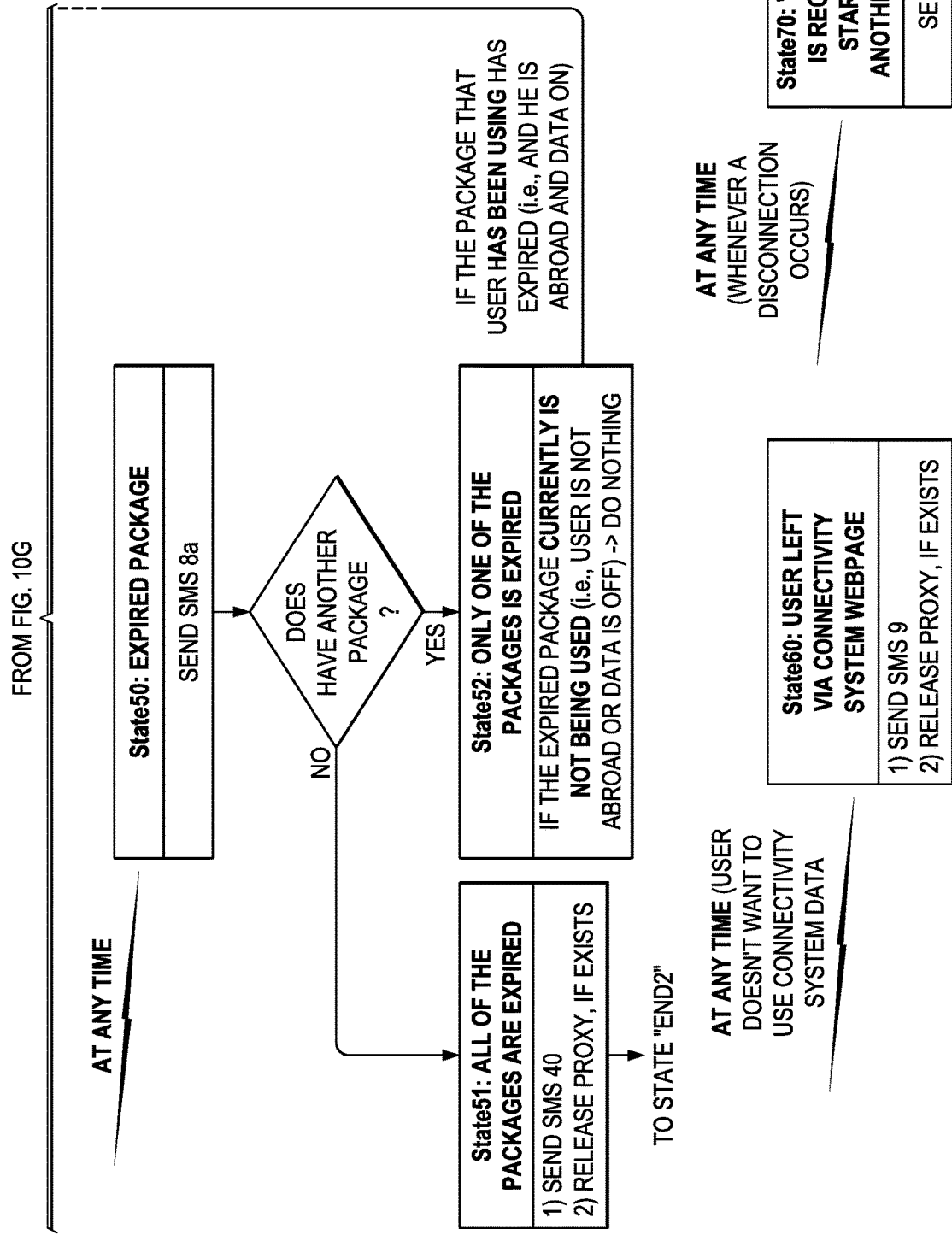

FIG. 9 is a flow diagram of a LTE connectivity system embodiment, in accordance with some embodiments of the invention. The connectivity system 910 may be located between the SGW and the PGW. Since it is usual to see more than one bearer in LTE (e.g., in VoLTE embodiments), the connectivity system performs a proxy operation for the default and dedicated bearers' setup for Internet traffic. The connectivity system may probe the Diameter protocol in order to catch relevant messages such as messages regarding update location, cancel location, etc. As described herein, the connectivity system may probe for MAP protocol as well.

FIG. 9 shows default bearer 902 and supplementary bearer 904 signals transmitted from the SGW (associated with SGSN) to the PGW. General purpose bearer signals 906 carrying Internet, email, application data may be transmitted from the SGW to the connectivity system, and then from the connectivity system to the PGW. VoLTE speech bearer signals 908 may be transmitted from the PGW to the SGW.

Any features described in the specification with respect to 3G network are also applicable to LTE networks. GPRS attach, SGSN, GGSN, MAP protocol, HLR, create PDF context request in GPRS/UMTS networks may correspond to data attach, SGW, PGW, diameter protocol, HLR/HSS, create session request, respectively, in LTE networks.

FIGS. 10A to 10H are a process flow for a connectivity system and a mobile device, in accordance with some embodiments of the invention. In some embodiments, the connectivity system may refer to the connectivity system and/or any other system (e.g., mobile device or any other local or remote computing apparatus) in communication with, either directly or in directly, with the connectivity system. The other system may be in direct or indirect (via one or more other systems) wired or wireless communication with the connectivity system. In some embodiments, any reference to a mobile device may additionally or alternatively refer to at least one of a user associated with the mobile device, an account associated with the mobile device, or a computing device in communication with the mobile device.

A user may board a flight in a first area (e.g., in a first country) where the user has an active mobile network (or cellular network) subscription and land in a second area (e.g., in the first country or in a second country) where the user does not have an active mobile network subscription or where the cellular network associated with the active subscription does not provide coverage. Once the user lands in the second area, the user may turn on the mobile device. Prior to the mobile device being turned on, it is in an initial state (state 1). Once the mobile device is turned on, the IMSI attach process starts and the new state of the mobile device is a voice roamer state (state 2). In state 2, the connectivity system determines whether the mobile device is a previously unresponsive mobile device or a user who previously left the network. If the answer is yes from state 2, the mobile device is determined to not be a registered mobile device or user (END1). At any time, if the mobile device purchases a package and becomes a registered mobile device (state 80), the connectivity system sends a message to the mobile device informing the user of the mobile device that the mobile device is a registered mobile device. If the answer is "no" from state 2, the connectivity system listens for GPRS attachment (data transmission and/or reception associated with mobile device) in state 3. If GPRS attachment is successful within a certain period and no package is purchased by the mobile device within a certain period of the GPRS attachment being successful, the mobile device returns to the END1 state. If GPRS attachment is not successful within a certain period and no package is purchased within a certain period, the mobile device obtains a silent roamer status (state 4).

If the mobile device is determined to be a silent roamer (state 4), the connectivity system sends a message (e.g., a SMS message) to the mobile device. If the mobile device responds to the message within a certain period, the mobile device achieves state 5, in which the mobile device is an opted-in user and the data operation of the mobile device is determined to be off. A certain amount of data (free of charge) is activated for the mobile device and a message is transmitted to the mobile device informing the user of this certain amount of data. The connectivity system also listens for GPRS attachment of the mobile device in state 5. If the GPRS attachment is successful within the certain period, the mobile device obtains the opted-in user state and/or GPRS attached state (state 6). If the GPRS attachment from state 5 is not successful within the certain period, the mobile device obtains the non-responsive user state (state 91). In this state, a certain number of messages may be sent from the connectivity system to the mobile device with an interval between each message. Each message may remind a user to turn on a data operation associated with the mobile device. If the GPRS attachment of state 5 is successful within a certain period in state 91, the mobile device enters state 6. If the mobile device remains in state 91 for a certain period, the mobile device is determined to be an inactive user (state 101). In such an instance, the connectivity system deactivates the previously activated certain amount of data for the mobile device. The connectivity system may send a message to the mobile device informing the user of this deactivation. The mobile device then enters END2 state in which the connectivity system does not perform any functions (e.g., transmissions or receptions of messages) associated with the mobile device.

While in state 4, if the mobile device does not respond to the connectivity system's message for a certain period, the mobile device enters state 90 in which it is determined to be a non-responsive user. In such a state, the connectivity system resends the same or a similar message to the mobile device a certain number of times with an interval between each instance of sending the message to the mobile device. If the mobile device responds to the message opting in to the connectivity system's limited service (e.g., certain amount of free data), the mobile device enters state 5. If the mobile device does not respond for a period of time in state 90, the mobile device enters state 100 in which it is determined to be an inactive user. Alternatively, from state 4, if the mobile device replies "no" to opting in to the connectivity system's limited service (e.g., certain amount of free data), the mobile device enters the inactive user state. The connectivity system may send a message to the mobile device in this state informing the mobile device that it has entered the inactive user state. The mobile device is now in the END2 state.

While in state 6, the method of FIG. 4 is performed for the mobile device. For example, the connectivity system acts as a data access proxy for the mobile device that enables the mobile device to access data using the foreign mobile network without needing to install a new SIM card associated with the foreign mobile network. In state 6, the proxy function of the connectivity system is activated for the mobile device if it has not been previously activated. As used herein, a SIM card may refer to any type of card or cardless activation mechanism for a mobile device on a network. In state 6, the mobile device displays a screen prompting the mobile device become a registered mobile device (i.e., an option to purchase a data package). If the user selects an option to not become a registered mobile device, the mobile device enters state 94 in which the mobile device has the status of a released user. In such a state, the connectivity system deactivates the previously activated certain amount of data for the mobile device. The connectivity system also stops acting as a data access proxy for the mobile device. The connectivity system may send a message to the mobile device informing the mobile device of these updates. While in state 6, if the mobile device does not respond to a prompt to become a registered mobile device, the mobile device obtains the status of a non-responsive user (state 92). In this state, the mobile device may send periodic messages to the mobile device prompting the mobile device to become a registered mobile device. If the mobile device spends a certain amount of time in state 92, the mobile device obtains the status of an inactive user (state 102). In such a state, the connectivity system deactivates the previously activated certain amount of data for the mobile device. The connectivity system also stops acting as a data access proxy for the mobile device. The connectivity system may send a message to the mobile device informing the mobile device of these updates. The mobile device then enters the state END2. While in state 92, if the mobile device actively rejects the prompt or offer to become a registered mobile device, the mobile device obtains state 94.

If while in state 6 or alternatively while in state 92, the user of the mobile device selects an option to become a registered mobile device (e.g., selects a purchase option), the mobile device obtains a captive user state (state 7) and a screen showing a list of packages and cost of each package may be displayed. While in state 7, if the mobile device becomes a registered mobile device (e.g., by purchasing a data package), the mobile device obtains state 8. While in state 7, if the mobile device does not become a registered mobile device within a certain period, the mobile device obtains state 95 (unresponsive captive status). While in this state, the connectivity system sends periodic messages to the mobile device providing reminders to become a registered mobile device. While in state 95, if the mobile device becomes a registered mobile device (e.g., by purchasing a data package), the mobile device obtains state 8.

While in state 3 (resolution state), if GPRS attachment for the mobile device is unsuccessful within a certain period and the mobile device is a registered mobile device, the mobile device obtains state 30. While in state 30, the connectivity system sends a message to the mobile device reminding the user of the mobile device that the mobile device is a registered mobile device but that the GPRS connection is unsuccessful for the mobile device (e.g., because a user has turned off, on the mobile device, a data connection to and/or from the mobile device). While in state 30, if GPRS attachment is successful within a certain period because a data connection to the mobile device has been turned on, the mobile device reaches state 8. State 8 is that of an already registered (prepurchased) user. In state 8, the prepurchased package associated with the mobile device is activated for the mobile device (e.g., by the connectivity system). Also, the proxy function of the connectivity system is also activated for the mobile device if it has not been previously activated. Additionally, in state 8, the connectivity system sends a message to the mobile device informing the user of the activation of the data package and/or proxy. In state 8, the user can use the mobile device for data functions (e.g., email, apps, Internet, etc.).

From state 30, if the GPRS attachment is unsuccessful within a certain period, the mobile device reaches state 93, in which a response is not received from the mobile device. In such a state, the connectivity system sends multiple messages to the mobile device, each device being sent after a certain interval. Each message may remind the user of the mobile device to activate the data transmission (i.e., data access) to and from the mobile device. If there is no response within a certain period, the mobile device enters state 96, which is the unresponsive state. From this state, the mobile device reaches the END2 state. If, from state 93, the data connection for the mobile device is activated within a certain period, the mobile device obtains state 8.

When the data package is activated (along with the proxy function of the connectivity system) for the mobile device, the mobile device obtains the active user state (state 9). If, while in state 9, the user of the mobile device (or some other user on some other remote computing device) purchases another package for the mobile device, the mobile device enters state 81 in which the mobile device, which is already a registered mobile device, purchases another package. The connectivity system may send the mobile device a message informing the user of this additional purchase. While in state 9, the connectivity system may send periodic messages to the mobile device informing the mobile device of how much time and/or data usage amount is remaining and/or has been consumed on the purchased package. The connectivity system may send more frequent messages as the amount of available data becomes less and less. Once the amount of available data falls below a certain threshold level or drops to zero, the mobile device obtains the finished package state (state 10).

While in state 10, the connectivity system sends a message to the mobile device informing the user of the mobile device that the purchased data package has been exhausted. While in state 10, if the mobile device is associated with one or more other non-exhausted packages, the mobile device enters state 12. In state 12, one of the other non-exhausted (e.g., unused or partially used) packages are activated for the mobile device and then the mobile device enters state 8. While in state 10, if the mobile device is not associated with any other non-exhausted packages, the mobile device enters state 11. In state 11, the connectivity system activates a limited amount of data (i.e., free data) and sends a message to the mobile device informing the mobile device of this activated data. From state 11, the mobile device enters state 6.

While in any state or at any time during the method of FIG. 10, the mobile device may obtain state 50 which means the data package (e.g., a purchased data package) associated with the mobile device has expired, regardless of whether it has been exhausted or is not exhausted. While in this state, the connectivity system may determine whether another unexpired package (e.g., purchased package) exists for the mobile device. If another unexpired package does not exist, the connectivity system sends a message to the mobile device informing the user of the mobile device that no other unexpired package exists. Additionally, the connectivity system deactivates the connectivity system's proxy service or function for the mobile device. If another unexpired package exists for the mobile device and the data connection of the mobile device is activated (and the mobile device is in a foreign mobile network, e.g., in a foreign country), the mobile device obtains state 8. If another unexpired package exists for the mobile device and the data connection of the mobile device is not activated or the mobile device is not located in a foreign mobile network (e.g., in a foreign country), the connectivity system does not perform any function for the mobile device.

While in any state or at any time during the method of FIG. 10, the user of a mobile device may select an option to exit the connectivity system's service (or an option to stop using data access provided through the connectivity system). If such a selection is made, the connectivity system is deactivated as a proxy for the mobile device. Additionally, the connectivity system may send a message to the mobile device providing or confirming this update.

While in any state or at any time during the method of FIG. 10, the user of a mobile device may select a "cancel location" option. Alternatively, this option may be automatically received if the user selects to use a different operator or different connectivity system. In such an instance, the connectivity system may send a message to the mobile device informing the mobile device of the disconnection.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems.

The term signal, signals, or data may refer to a single signal or multiple signals. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, the term "modify" or "modification" may be interchangeably used with the term "transform" or "transformation."

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s), and their equivalents, that are protected thereby. In all instances, the scope of such claims shall be considered on their own merits in light of this disclosure, but should not be constrained by the headings herein.

The invention claimed is:

1. A connectivity system for directing data traffic in a foreign mobile network, the connectivity system for:
receiving data traffic from a visited serving general packet radio system support node (SGSN) or serving gateway (SGW) associated with the foreign mobile network, wherein the visited SGSN or SGW receives the data traffic from a foreign access point name (APN) associated with a mobile device, and wherein a network address lookup for the foreign APN results in a network address of the connectivity system;
determining whether the data traffic comprises local breakout (LBO) traffic or non-LBO traffic; and
in response to determining the data traffic comprises the LBO traffic, transmitting the LBO traffic to a visited gateway general packet radio system support node (GGSN) or packet gateway (PGW) associated with the foreign mobile network,
wherein data access is offered or provided to the mobile device based on:
executing a first attach operation for the mobile device, the first attach operation resulting in a successful first attachment for the mobile device,
determining a second attachment for the mobile device, associated with a second attach operation for the mobile device during a particular period, is unsuccessful, and
classifying the mobile device as a silent roamer, based at least partially on the successful first attachment, and based at least partially on the unsuccessful second attachment.

2. The connectivity system of claim 1, wherein the LBO traffic is associated with a subscription to the connectivity system, and wherein the subscription comprises a first quota of the data access.

3. The connectivity system of claim 1, wherein the connectivity system is further for in response to determining the data traffic comprises the non-LBO traffic, transmitting the LBO traffic to the visited GGSN or PGW associated with the foreign mobile network.

4. The connectivity system of claim 1, wherein domestic data traffic associated with a domestic APN is transmitted directly from the visited SGSN or SGW to the visited GGSN or PGW, and is not transmitted via the connectivity system.

5. The connectivity system of claim 1, wherein domestic data traffic is received from the mobile device.

6. The connectivity system of claim 1, wherein the mobile network comprises at least one of a 2G, 3G, 4G, 5G, or Long Term Evolution (LTE) network.

7. The connectivity system of claim 1, wherein the mobile device accesses the Internet, via the connectivity system, using the foreign mobile network without connecting to a home network of the mobile device, and without changing an APN setting of the mobile device.

8. The connectivity system of claim 1, wherein the connectivity system is located between the visited SGSN or SGW associated with the foreign mobile network, and the visited GGSN or PGW associated with the foreign mobile network.

9. The connectivity system of claim 1,
wherein the first attach operation comprises an international mobile subscriber identity (IMSI) attach operation, or
wherein the first attach operation is executed before, after, or substantially simultaneously with the second attach operation.

10. A method for directing data traffic in a mobile network, the method comprising:
receiving data traffic from a visited serving general packet radio system support node (SGSN) or serving gateway (SGW) associated with the mobile network, wherein the visited SGSN or SGW receives the data traffic from a foreign access point name (APN) associated with a mobile device, wherein a network address lookup for the foreign APN results in a network address of a connectivity system located remotely from the mobile device;
determining, using one or more computing device processors comprised in the connectivity system located remotely from the mobile device, whether the data traffic comprises local breakout (LBO) traffic or non-LBO traffic; and
in response to determining the data traffic comprises the LBO traffic, transmitting the LBO traffic to a visited gateway general packet radio system support node (GGSN) or packet gateway (PGW) associated with the mobile network,
wherein data access is offered or provided to the mobile device based on:
executing a first attach operation for the mobile device, the first attach operation resulting in a successful first attachment for the mobile device,
determining, using the one or more computing device processors comprised in the connectivity system located remotely from the mobile device, a second attachment for the mobile device, associated with a second attach operation for the mobile device during a period, is unsuccessful, and
classifying, using the one or more computing device processors comprised in the connectivity system located remotely from the mobile device, the mobile device as a silently roaming mobile device, based at least partially on the successful first attachment, and based at least partially on the unsuccessful second attachment.

11. The method of claim 10, wherein the LBO traffic is associated with a subscription to the connectivity system, and wherein the subscription comprises a first quota associated with the data access.

12. The method of claim 10, further comprising in response to determining the data traffic comprises the non-LBO traffic, transmitting the LBO traffic to the visited GGSN or PGW associated with the mobile network.

13. The method of claim 10, wherein domestic data traffic associated with a domestic APN is transmitted directly from the visited SGSN or SGW to the visited GGSN or PGW, and is not transmitted via the connectivity system.

14. The method of claim 10, wherein domestic data traffic is received from the mobile device.

15. The method of claim 10, further comprising:
deactivating, for the mobile device, a proxy service associated with the connectivity system for providing the data access to the mobile device; or
receiving, from the mobile device, an instruction to deactivate the proxy service provided by the connectivity system for the mobile device, the proxy service enabling the data access, via the connectivity system, for the mobile device; or
receiving, from a second mobile network, notification that the mobile device has connected to the second mobile network, wherein the proxy service, associated with the connectivity system, for providing the data access to the mobile device is deactivated for the mobile device.

16. The method of claim 10,
wherein the first attach operation is executed before, after, or substantially simultaneously with the second attach operation, or
wherein the first attach operation comprises an international mobile subscriber identity (IMSI) attach operation.

17. The method of claim 10, wherein the mobile device accesses the Internet without connecting to a home network of the mobile device, and without changing an APN setting of the mobile device.

18. The method of claim 10, wherein the connectivity system is located between the visited SGSN or SGW associated with the mobile network, and the visited GGSN or PGW associated with the mobile network.

19. The method of claim 10, wherein the mobile network comprises at least one of a 2G, 3G, 4G, 5G, or Long Term Evolution (LTE) network.

20. A method for directing data traffic in a mobile network, the method comprising:
receiving data traffic from a serving general packet radio system support node (SGSN) or serving gateway (SGW) associated with the mobile network, wherein the SGSN or SGW receives the data traffic from a foreign access point name (APN) associated with a mobile device, wherein a network address lookup for the foreign APN results in a network address of a connectivity system located remotely from the mobile device;
determining, using one or more computing device processors comprised in the connectivity system located remotely from the mobile device, whether the data traffic comprises local breakout (LBO) traffic or non-LBO traffic; and
in response to determining the data traffic comprises the LBO traffic, transmitting the LBO traffic to a gateway general packet radio system support node (GGSN) or packet gateway (PGW) associated with the mobile network, wherein data access is offered or provided to the mobile device based on:
  executing a first attach operation for the mobile device, the first attach operation resulting in a successful first attachment for the mobile device,
  determining, using the one or more computing device processors comprised in the connectivity system located remotely from the mobile device, a second attachment for the mobile device, associated with a second attach operation for the mobile device during a period, is unsuccessful, and
  classifying, using the one or more computing device processors comprised in the connectivity system located remotely from the mobile device, the mobile device as a silently roaming mobile device, based at least partially on the successful first attachment, and based at least partially on the unsuccessful second attachment.

* * * * *